US011945697B2

(12) United States Patent
Sikora et al.

(10) Patent No.: US 11,945,697 B2
(45) Date of Patent: Apr. 2, 2024

(54) MULTIPLE REMOTE CONTROL FOR SUSPENDED LOAD CONTROL EQUIPMENT APPARATUS, SYSTEM, AND METHOD

(71) Applicant: Vita Inclinata IP Holdings LLC, Broomfield, CO (US)

(72) Inventors: Derek Sikora, Denver, CO (US); Logan Goodrich, Golden, CO (US)

(73) Assignee: Vita Inclinata IP Holdings LLC, Broomfield, CO (US)

( * ) Notice: Subject to any disclaimer, the term of this patent is extended or adjusted under 35 U.S.C. 154(b) by 0 days.

(21) Appl. No.: 18/202,234

(22) Filed: May 25, 2023

(65) Prior Publication Data

US 2023/0303364 A1 Sep. 28, 2023

Related U.S. Application Data

(63) Continuation-in-part of application No. 16/988,373, filed on Aug. 7, 2020, which is a continuation of application No. PCT/US2019/013603, filed on Jan. 15, 2019.

(60) Provisional application No. 62/627,920, filed on Feb. 8, 2018.

(51) Int. Cl.

*G06F 7/00* (2006.01)
*B66C 13/06* (2006.01)
*B66C 13/40* (2006.01)
*B66D 1/48* (2006.01)

(52) U.S. Cl.

CPC ............ *B66C 13/063* (2013.01); *B66C 13/40* (2013.01); *B66D 1/485* (2013.01)

(58) Field of Classification Search

CPC ........ B66C 13/063; B66C 13/40; B66D 1/485
USPC ............................................ 700/28, 32, 213
See application file for complete search history.

(56) References Cited

U.S. PATENT DOCUMENTS

| | | | |
|---|---|---|---|
| 1,935,283 | A | 11/1933 | Adams |
| 2,264,936 | A | 12/1941 | Dorsa |
| 2,428,656 | A | 10/1947 | Elliott et al. |
| 2,651,533 | A | 9/1953 | Cecil |
| 2,717,656 | A | 9/1955 | Bannister |
| 3,036,797 | A | 5/1962 | Domenico |
| 3,044,818 | A | 7/1962 | Harry |
| 3,210,115 | A | 10/1965 | Irving et al. |
| 3,265,336 | A | 8/1966 | Peterson |
| 3,498,476 | A | 3/1970 | Mattson et al. |

(Continued)

FOREIGN PATENT DOCUMENTS

| | | | |
|---|---|---|---|
| EP | 0606108 | A1 | 7/1994 |
| GB | 2327657 | A | 2/1999 |

(Continued)

OTHER PUBLICATIONS

All pages, Written Opinion dated Apr. 30, 2020 for PCT Application No. PCT/US2020/017790, filed Feb. 11, 2020.

(Continued)

*Primary Examiner* — Yolanda R Cumbess
(74) *Attorney, Agent, or Firm* — Martin Spencer Garthwaite

(57) ABSTRACT

Horizontal translation, pendular motion, and or yaw control of a load suspended from a carrier with a suspended load control system, wherein control input to the suspended load control system may be provided through the use of more than one remote pendant.

20 Claims, 14 Drawing Sheets

(56) References Cited

U.S. PATENT DOCUMENTS 3,554,468 A 1/1971 Mcvicar
3,598,440 A 8/1971 Ramsden et al.
3,601,342 A 8/1971 Piasecki
3,602,544 A 8/1971 Marsh
3,656,796 A 4/1972 Cook
3,690,602 A 9/1972 Marsh
3,724,817 A 4/1973 Simons
3,829,052 A 8/1974 Flannelly
3,833,189 A 9/1974 Fowler et al.
3,838,836 A 10/1974 Asseo et al.
3,904,156 A 9/1975 Smith
3,946,971 A 3/1976 Chadwick
4,124,181 A 11/1978 Kolwey
4,138,078 A 2/1979 Hester et al.
4,267,987 A 5/1981 McDonnell
4,364,704 A 12/1982 Dreesen et al.
4,378,919 A 4/1983 Smith
4,553,719 A 11/1985 Ott
4,601,444 A 7/1986 Lindenbaum
4,695,012 A 9/1987 Lindenbaum
4,747,745 A 5/1988 Pippen et al.
4,826,109 A 5/1989 Camus
4,881,601 A 11/1989 Smith
4,883,184 A 11/1989 Albus
4,889,297 A 12/1989 Ikeda
4,984,757 A 1/1991 Hartung et al.
5,071,184 A 12/1991 Dessaux
5,071,573 A 12/1991 Coffindaffer et al.
5,125,707 A 6/1992 Chaen et al.
5,131,491 A 7/1992 Varner et al.
5,143,326 A 9/1992 Parks
5,190,250 A 3/1993 DeLong et al.
5,249,652 A 10/1993 Leitzman et al.
5,273,333 A 12/1993 Hatfield et al.
5,299,845 A 4/1994 Gabriel
5,344,203 A 9/1994 Tollenaere
5,352,056 A 10/1994 Chandler
5,358,219 A 10/1994 Shenk et al.
5,396,815 A 3/1995 Polites et al.
5,443,566 A 8/1995 Rushmer et al.
5,451,032 A 9/1995 Rhoads
5,465,925 A 11/1995 Connolly et al.
5,499,785 A 3/1996 Roberts et al.
5,518,205 A 5/1996 Wurst et al.
5,524,870 A 6/1996 Tallent et al.
5,562,394 A 10/1996 Brown, Jr.
5,593,113 A 1/1997 Cox
5,613,722 A 3/1997 Fandrich et al.
5,816,636 A 10/1998 Gibson et al.
5,871,249 A 2/1999 Williams
5,898,746 A 4/1999 Baversten et al.
5,927,438 A 7/1999 Ostrobrod
5,961,563 A 10/1999 Overton
6,189,834 B1 2/2001 Dietz et al.
6,199,793 B1 3/2001 Hainsworth et al.
6,439,407 B1 8/2002 Jacoff et al.
6,533,220 B2 3/2003 Schuster
D473,482 S 4/2003 Felmingham
6,578,796 B2 6/2003 Maeda
6,708,926 B2 3/2004 Bonisch
6,814,185 B1 11/2004 Ostrobrod
6,983,833 B2 1/2006 Ivers et al.
7,028,351 B1 4/2006 Frieder et al.
7,131,515 B2 11/2006 Gartsbeyn et al.
7,267,240 B2 9/2007 Maurer et al.
7,720,582 B2 5/2010 Makinadjian
D617,293 S 6/2010 Yoshihashi
7,887,011 B1 2/2011 Baldwin
7,948,237 B2 5/2011 Kuzmin et al.
8,131,384 B2 3/2012 Karpman et al.
8,157,205 B2 4/2012 McWhirk
8,226,042 B1 7/2012 Howell et al.
8,231,083 B2 7/2012 Kutzmann et al.
8,292,229 B2 10/2012 Pancotti et al.
D671,293 S 11/2012 Fredriksson
8,413,923 B2 4/2013 Brenner et al.
8,496,279 B2 7/2013 Aoki
8,534,607 B2 9/2013 Tardiff et al.
8,534,608 B1 9/2013 Cox, IV
8,591,161 B1 11/2013 Bernhardt
8,840,355 B1 9/2014 Kulesha
8,886,402 B1 11/2014 Lou
8,888,048 B2 11/2014 Figoureux et al.
8,894,050 B2 11/2014 Wootten et al.
8,899,903 B1 12/2014 Saad et al.
8,903,568 B1 12/2014 Wang et al.
8,925,901 B2 1/2015 Gaillard
8,938,325 B1 1/2015 McGinnis et al.
8,967,533 B2 3/2015 DeVaul et al.
9,027,976 B1 5/2015 Tollenaere
9,096,294 B1 8/2015 Dong et al.
9,114,871 B2 8/2015 Woodworth et al.
9,194,977 B1 11/2015 Dungan et al.
9,205,922 B1 12/2015 Bouwer
9,223,008 B1 12/2015 Hartman et al.
9,242,741 B1 1/2016 Cockell
9,302,770 B2 4/2016 Burgess et al.
9,375,841 B1 6/2016 Kemper
9,422,139 B1 8/2016 Bialkowski et al.
9,676,481 B1 6/2017 Buchmueller
9,688,404 B1 6/2017 Buchmueller et al.
9,797,723 B1 10/2017 Huang
9,800,091 B2 10/2017 Nugent, Jr. et al.
9,836,063 B1 12/2017 Bonawitz et al.
9,849,981 B1 12/2017 Burgess et al.
9,850,113 B2 12/2017 Melin et al.
9,881,506 B1 1/2018 Gentry
9,908,756 B2 3/2018 Heravi et al.
9,958,876 B2 5/2018 Lind et al.
10,023,312 B2 7/2018 Repp et al.
10,023,313 B2 7/2018 Behrens et al.
10,071,804 B1 9/2018 Buchmueller et al.
10,112,805 B1 10/2018 Joralmon
10,286,943 B1 5/2019 Greenblatt et al.
10,288,075 B2 5/2019 Ishiba
10,451,504 B2 10/2019 Campbell et al.
10,479,503 B2 11/2019 Sikora et al.
10,519,013 B2 12/2019 Curran et al.
10,676,190 B2 6/2020 Mitchell et al.
10,870,558 B2 12/2020 Sikora et al.
10,899,586 B2 1/2021 Cranney, III
10,918,892 B2 2/2021 Dickson
10,940,061 B2 3/2021 Sikora et al.
10,960,976 B2 3/2021 Bosma et al.
11,008,198 B2 5/2021 Sikora et al.
11,142,316 B2 10/2021 Sikora et al.
11,142,433 B2 10/2021 Sikora et al.
11,209,836 B1 12/2021 Sikora et al.
11,339,034 B2 5/2022 Sikora et al.
11,370,642 B2 6/2022 Markwell
11,535,496 B2 12/2022 Al-Husseini et al.
2002/0113448 A1 8/2002 Kazerooni et al.
2003/0085319 A1 5/2003 Wagner et al.
2003/0121024 A1 6/2003 Hill et al.
2003/0220177 A1 11/2003 Orlando
2004/0026349 A1 2/2004 Colgate et al.
2004/0032140 A1 2/2004 Solstad
2005/0072965 A1 4/2005 Sanders et al.
2005/0242237 A1 11/2005 Scott
2006/0163892 A1 7/2006 Nguyen et al.
2007/0200032 A1 8/2007 Eadie et al.
2008/0027566 A1 1/2008 Baek et al.
2008/0272568 A1 11/2008 Thompson
2009/0004004 A1 1/2009 Vincenzi
2009/0152391 A1* 6/2009 McWhirk ................. B64B 1/70
244/30
2009/0200428 A1 8/2009 Smith et al.
2010/0000349 A1 1/2010 Stevens et al.
2010/0012771 A1 1/2010 Jess
2010/0176618 A1 7/2010 Souke et al.
2010/0237183 A1 9/2010 Wilson et al.
2010/0291707 A1 11/2010 Mirkin et al.
2010/0319910 A1 12/2010 Ives et al.
2011/0192932 A1 8/2011 Brenner et al.

(56) References Cited

U.S. PATENT DOCUMENTS

| | | | |
|---|---|---|---|
| 2012/0006779 | A1 | 1/2012 | Mills et al. |
| 2012/0145832 | A1 | 6/2012 | Schuster |
| 2012/0150364 | A1 | 6/2012 | Tillotson et al. |
| 2012/0271582 | A1 | 10/2012 | Bageshwar et al. |
| 2012/0292434 | A1 | 11/2012 | Welsh |
| 2012/0293177 | A1 | 11/2012 | Dodds |
| 2013/0054054 | A1 | 2/2013 | Tollenaere et al. |
| 2013/0056586 | A1 | 3/2013 | Occhiato et al. |
| 2013/0081245 | A1 | 4/2013 | Vavrina et al. |
| 2013/0270393 | A1 | 10/2013 | Shrapnel |
| 2013/0299634 | A1 | 11/2013 | Haggard |
| 2014/0154965 | A1 | 6/2014 | Han et al. |
| 2014/0224755 | A1 | 8/2014 | Eriksson et al. |
| 2014/0252170 | A1 | 9/2014 | Prud'Homme-Lacroix |
| 2014/0333232 | A1 | 11/2014 | Verheyen |
| 2015/0041598 | A1 | 2/2015 | Nugent et al. |
| 2015/0151837 | A1 | 6/2015 | Sane et al. |
| 2015/0360779 | A1 | 12/2015 | Behrens et al. |
| 2016/0009393 | A1 | 1/2016 | Repp et al. |
| 2016/0009531 | A1 | 1/2016 | Saliba et al. |
| 2016/0031683 | A1 | 2/2016 | Fenker et al. |
| 2016/0048131 | A1 | 2/2016 | Lesperance et al. |
| 2016/0236779 | A1 | 8/2016 | Thomas et al. |
| 2016/0240417 | A1 | 8/2016 | Tomida |
| 2016/0297650 | A1 | 10/2016 | Bang |
| 2016/0298962 | A1 | 10/2016 | Lee |
| 2016/0332728 | A1 | 11/2016 | Winfree et al. |
| 2016/0340030 | A1 | 11/2016 | Roussey et al. |
| 2016/0340035 | A1 | 11/2016 | Duru |
| 2016/0340039 | A1 | 11/2016 | Waltner et al. |
| 2017/0009859 | A1 | 1/2017 | Sevagen |
| 2017/0052676 | A1 | 2/2017 | Pulier et al. |
| 2017/0073055 | A1 | 3/2017 | Song |
| 2017/0088261 | A1 | 3/2017 | Sequeira et al. |
| 2017/0129749 | A1 | 5/2017 | Mijangos et al. |
| 2017/0138737 | A1 | 5/2017 | Cordova et al. |
| 2017/0197718 | A1 | 7/2017 | Buchmueller |
| 2017/0217566 | A1 | 8/2017 | Ichinose |
| 2017/0276139 | A1 | 9/2017 | Ishiba |
| 2017/0284795 | A1 | 10/2017 | Carlson et al. |
| 2017/0291707 | A1 | 10/2017 | Veronesi et al. |
| 2018/0072404 | A1 | 3/2018 | Prager et al. |
| 2018/0099748 | A1 | 4/2018 | Lesperance et al. |
| 2018/0208309 | A1 | 7/2018 | Wang |
| 2018/0229855 | A1 | 8/2018 | Sane et al. |
| 2018/0251346 | A1 | 9/2018 | Thomson et al. |
| 2018/0252616 | A1 | 9/2018 | Bryson et al. |
| 2018/0282130 | A1 | 10/2018 | Kale et al. |
| 2018/0339891 | A1 | 11/2018 | Ijadi-Maghsoodi et al. |
| 2019/0016480 | A1 | 1/2019 | Kashiwa et al. |
| 2019/0031474 | A1 | 1/2019 | Stilborn et al. |
| 2019/0033892 | A1 | 1/2019 | Gomez et al. |
| 2019/0055111 | A1 | 2/2019 | Cranney, III |
| 2019/0193827 | A1 | 6/2019 | Zerweckh |
| 2019/0236370 | A1 | 8/2019 | Man |
| 2019/0241267 | A1 | 8/2019 | Sikora et al. |
| 2019/0337776 | A1 | 11/2019 | Fanello et al. |
| 2020/0087121 | A1 | 3/2020 | Ohayon et al. |
| 2020/0165010 | A1 | 5/2020 | Sun et al. |
| 2020/0180763 | A1 | 6/2020 | Schütz et al. |
| 2020/0182252 | A1 | 6/2020 | Nakasuji et al. |
| 2020/0210704 | A1 | 7/2020 | Han et al. |
| 2020/0222257 | A1 | 7/2020 | Sikora et al. |
| 2020/0231415 | A1 | 7/2020 | Sikora et al. |
| 2020/0271270 | A1 | 8/2020 | Sikora et al. |
| 2020/0369492 | A1 | 11/2020 | Sikora et al. |
| 2020/0400330 | A1 | 12/2020 | Przybylski et al. |
| 2021/0371250 | A1 | 12/2021 | Bedgood et al. |
| 2021/0371252 | A1 | 12/2021 | Sikora et al. |
| 2022/0121225 | A1 | 4/2022 | Sikora et al. |
| 2022/0135378 | A1 | 5/2022 | Sikora et al. |
| 2022/0274696 | A1 | 9/2022 | Sikora et al. |
| 2022/0274809 | A1 | 9/2022 | Sikora et al. |
| 2022/0277472 | A1 | 9/2022 | Birchfield et al. |
| 2022/0281721 | A1 | 9/2022 | Sikora et al. |
| 2022/0371736 | A1 | 11/2022 | Sikora et al. |
| 2023/0117935 | A1 | 4/2023 | Al-Husseini et al. |

FOREIGN PATENT DOCUMENTS

| | | | |
|---|---|---|---|
| GB | 2457149 | A | 8/2009 |
| GB | 2513646 | A | 11/2014 |
| JP | H04256686 | A | 9/1992 |
| JP | H0543184 | A | 2/1993 |
| JP | H05193584 | A | 8/1993 |
| JP | H07179288 | A | 7/1995 |
| JP | H09317795 | A | 12/1997 |
| JP | H10305989 | A | 11/1998 |
| JP | H1111859 | A | 1/1999 |
| JP | 2016210607 | A | 12/2016 |
| JP | 2017500257 | A | 1/2017 |
| JP | 2018140860 | A | 9/2018 |
| JP | 6554258 | B1 | 7/2019 |
| NO | 20171181 | A1 | 1/2019 |
| WO | 2011012915 | A1 | 2/2011 |
| WO | 2014071689 | A1 | 5/2014 |
| WO | 2018090104 | A1 | 5/2018 |
| WO | 2018234670 | A1 | 12/2018 |

OTHER PUBLICATIONS

Extended European Search Report and Search Opinion, Application No. EP 19 751 097.7, dated Aug. 31, 2021, 15 pages.
Internal Search Report dated Apr. 30, 2020 for PCT/US2020/017790, filed Feb. 11, 2020.
International Search Report dated Apr. 3, 2019, for PCT/US19/13603 filed Jan. 15, 2019.
International Search Report in PCT/US2020/062414, dated Feb. 19, 2021, entire document.
International Search Report dated May 27, 2020 for PCT.US20/19967 filed Feb. 26, 2020.
International Search Report dated Oct. 6, 2020, for PCT/US2020/042936, filed Jul. 2020.
Phillip J. Mckerrow, The design of a tethered aerial robot, Faculty of Informatics—Papers (Archive) Faculty of Engineering and InformationSciences University of Wollongong, Oct. 4, 2007, pp. 1-8, University of Wollongong, Australia, https://ro.uow.edu.au/infopapers/519.
Written Opinion in PCT/US2020/062414, dated Feb. 19, 2021, entire document.
Written Opinion dated Apr. 3, 2019, for PCT/US19/13603, filed Jan. 15, 2019.
Written Opinion dated May 27, 2020, for PCT/US20/19967, filed Feb. 26, 2020.
Written Opinion dated Oct. 6, 2020 for PCT/US2020/042936 filed Jul. 21, 2020.
Young, L.A , "Enhanced Rescue Lift Capability", 63rd Annual Forum of the AHS international, Virginia Beach, VA, May 1-3, 2007 (May 2007). FIG.2,5,12,16, Abstract pp. 6-12.

* cited by examiner

MULTIPLE REMOTE CONTROL FOR SUSPENDED LOAD CONTROL EQUIPMENT APPARATUS, SYSTEM, AND METHOD

CROSS-REFERENCE TO RELATED APPLICATIONS

The present application is a continuation-in-part of pending U.S. non-provisional patent application Ser. No. 16/988,373, filed 2020 Aug. 7, which application is a continuation of expired Patent Cooperation Treaty (PCT) application number PCT/US19/13603, filed 2019 Jan. 15; PCT application number PCT/US19/13603 claims the benefit of expired United States non-provisional patent application No. 62/833,394, filed 2018 Nov. 8, and claims the benefit of expired United States non-provisional patent application No. 62/627,920, filed 2018 Feb. 8; the present application and incorporates the subject matter thereof and claims the benefit of the filing dates thereof by this reference.

FIELD

This disclosure is directed to improved systems and methods for and related to an apparatus, system, and method which allows use of multiple remote controls to control a suspended load control system.

BACKGROUND

People and/or equipment ("loads") may be transported to or from a location as a load suspended by a cable from a helicopter or crane or may be suspended from a building or other structure, using a hoist system. Suspended loads are typically not buoyant, though may be. Cranes, helicopters, fixed wing aircraft, buildings, and other structures from which a load may be suspended on a suspension cable may be referred to herein as "carriers". During suspended load operations, loads are subject to winds and other external and internal factors that may cause the load to move in an unstable, unpredictable, undesirable, and/or hazardous manner.

Operators of carriers, such as helicopter and crane crews or a maintenance crew on a building, may use equipment that provides control of a suspended load, including equipment that provides suspended load control remote from the carrier, e.g. at or near a load, using remotely powered fans. Such equipment is referred to herein as a suspended load control system ("SLCS").

In hoist and sling operations or otherwise when transporting a suspended load by a carrier, observed motion of suspended loads includes the following components: vertical translation (motion up and down) along the Y axis (referred to herein as "vertical translation"); horizontal translation along either or both the X and Z axis; and rotation or "yaw" about the Y axis. Roll (rotation about the X axis) and pitch (rotation about the Z axis) may also occur, though if a load is suspended by a cable and is not buoyant, the typical motions are vertical translation, horizontal translation, and yaw. Axis, when discussed herein, are relative to a normal axis of a suspended load. Vertical and horizontal translation may be caused by movement of the suspension cable, movement of the carrier, winding of a winch up or down relative to a carrier, movement of the load, differences in speed and momentum between the load and the carrier, by wind—including propeller wash—impacts, and external forces. Horizontal translation can manifest as lateral motion or as conical pendulum motion of the load, with the pivot point of the pendulum where the cable is secured to the carrier ("pendular motion"); pendular motion generally also includes a component of vertical translation and may also be referred to as elliptical motion.

Yaw, lateral motion, and pendular motion complicate lift operations, cause delays, injury, and can lead to death of aircrew, crane operators, and of people on the ground. Yaw can produce dizziness and disorientation in humans and transported non-human animals. Yaw and lateral and pendular motion can also interfere with bringing a load into or delivering a load to a location. For example, delivery of a load to a deck of a ship may be complicated by pendular motion or yaw of the load, even if the deck is stable and is not also subject to heave, roll, or pitch, as it may be. For example, bringing a person in a litter into a helicopter or onto a helicopter strut may be hazardous if the litter is undergoing yaw or pendular motion as it is drawn up to the helicopter. One or more components of undesired motion of the load may increase in amplitude and/or frequency and otherwise grow more pronounced as a load is drawn up to the carrier and the suspension cable shortens. Horizontal and pendular motion of a load can also interact with the carrier to produce dangerous reactive or sympathetic motion in the carrier.

In addition, some suspended load operations may involve an obstacle, such as a surface, cliff wall, building, bridge, tree limb, overhang, narrow passage or other obstacle that may interfere with one or more of carrier, load, and/or suspension cable. It may be desirable to move the load relative to such an obstacle, or for other reasons, in a manner which does not involve the load hanging at a lowest energy position below the carrier.

In some circumstances, control of an SLCS may be by one person, using one wireless remote control, also referred to herein as a "remote pendant" or "pendant". However, in some circumstances, it may be desirable or necessary for more than one person or more than one remote pendant to be used to control an SLCS. For example, in a rescue operation beneath a helicopter, a first person supporting the rescue operation may be in the helicopter, while a second person supporting the rescue operation may be with or proximate to a suspended load, where the suspended load comprises a rescue litter. During a first part of the rescue operation, both persons may desire for the second person to control the SLCS, because, for example, the second person may be closer to the SLCS and the rescue litter, may better see and experience how the SLCS and rescue litter are behaving in the environment beneath the helicopter, may have capability to provide input into a second remote pendant carried by the second person, and the like. However, during another part of the rescue operation the second person may be occupied with other tasks which may conflict with providing input into a remote pendant, such as with care for a patient in the rescue litter, fending off obstacles proximate to the rescue litter, communicating with others, and or the second person may loose the ability to provide input into the remote pendant. In such or similar circumstances, one or both persons may desire for the first person to control the SLCS. In addition, by way of example, in the context of a lift operation on a construction site in which an SLCS is used to control a load beneath a crane, the load may need to be picked up from a first location on the construction site and transported as a suspended load to a second location on the construction site. In this example, a single person may not have an unobstructed view of both locations and or a single person may not be able to communicate with the SLCS as it is transported from the first location to the second location by the crane, such as due to distance, visual obstructions, obstructions radio-frequency communication, and the like.

However, SLCS systems may perform life-saving operations or operations that could pose a danger to people, both on the ground, in the carrier, and proximate to a suspended load, to property, and the like. Whether or not a life-saving or potentially dangerous operation is being performed with an SLCS, it may be desirable to transfer control of an SLCS between people and or remote pendants, for control and transfer of control of the SLCS to be predictable, recognizable, and to accommodate the circumstances of the operation and the needs and desires of those involved in the operation.

Management of loads and carriers would be improved if the load may be moved independently from the carrier, including horizontal translation, pendular motion, and or yaw control, wherein control input for performing such operations may be provided through the use of more than one remote pendant.

DETAILED DESCRIPTION

Figure 1:
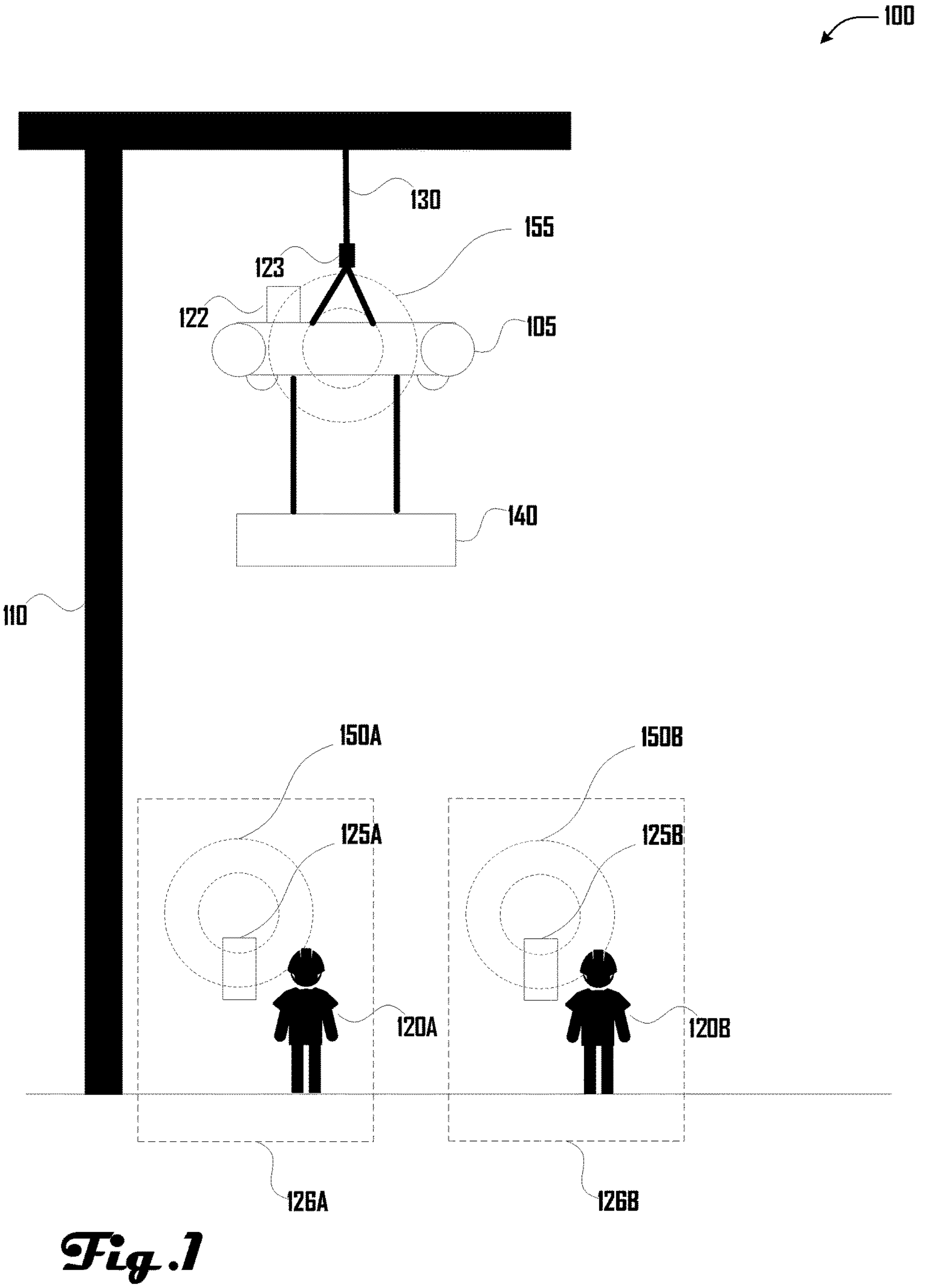
FIG. 1 is a view of a first embodiment of a suspended load control system, two remote pendants, and a first embodiment of a carrier, in accordance with an embodiment.

It is intended that the terminology used in the description presented below be interpreted in its broadest reasonable manner, even though it is being used in conjunction with a detailed description of certain examples of the technology. Although certain terms may be emphasized below, any terminology intended to be interpreted in a restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "coupled," or any variant thereof means any coupling, either direct or indirect between two or more elements; a coupling between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list. References may be made herein to modules, routines, and subroutines; generally, it should be understood that a module or routine is a software program or logic executed by computer hardware and that a subroutine is a software program executed within a module or routine. However, modules or routine discussed herein may be executed within another module or routine and submodules or subroutines may be executed independently (modules or routines may be submodules or subroutines and visa versa). Logic illustrated within modules may be reordered and or performed by other modules, or the like.

As used herein, "releasable," "connect," "connected," "connectable," "disconnect," "disconnected," and "disconnectable" refers to two or more structures which may be connected or disconnected, generally without the use of tools (examples of tools including screwdrivers, pliers, wrenches, drills, saws, welding machines, torches, irons, and other heat sources) and generally in a repeatable manner. As used herein, "attach," "attached," or "attachable" refers to two or more structures or components which are attached through the use of tools or chemical or physical bonding. As used herein, "secure," "secured," or "securable" refers to two or more structures or components which are either connected or attached.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. It should also be noted that the term "or" is generally employed in its sense including "and/or" or "and or" unless the content clearly dictates otherwise.

Approaches to control suspended loads include countermeasures installed on a carrier. For example, some airframes, such as the Skycrane™, have a rail system installed beneath a cabin to mitigate sway of a load, though, being remote from the suspended load, such rail system has margin effect. Some approaches to this problem involve automated countering algorithms in an aircraft's stability augmentation system, though, again, the effect of these measures is limited. At times, crew chiefs who remain within a helicopter during an extraction try to affect a suspended load by pushing or pulling a suspension cable from the helicopter; such efforts have limited effect and can be hazardous. Carriers may move loads at slow rates to minimize horizontal or pendular motion, may move loads at a high rate to increase an angle between the load and the carrier and allow a load to move outside of a column of air produced by the carrier, or may use additional suspension cables or dedicated control cables (whether on the ground, neighboring structures, or on a carrier); these measures increase costs, complexity, and risk of failure. All of these measures are inadequate, indeterminate, and highly problematic.

In various embodiments, as described further herein, a suspended load control system provides control of a load, independent from a carrier. The suspended load control system or load stability system (referred to together as, "SLCS") of this disclosure controls a load by exerting force from thrusters, fans, or propellers, as are found in electric ducted fans at, or near, the location of the load. Thrusters, fans, propellers and electric ducted fans are referred to herein as "EDFs". Vector thrust force produced by the EDFs may be used to counteract yaw and pendular motion, may be used to translate a load horizontally, such as to avoid an obstacle or to move a load into an offset position relative to a normal lowest-energy hanging position, or may otherwise be used to control the fine location and yaw of a load, independently from the carrier.

Control of an SLCS may be by more than one remote pendant or people, using wireless communication media, such as radio frequency or other wireless bandwidth ("wireless bandwidth").

SLCS's and remote pendants may have limited wireless bandwidth. The wireless bandwidth may need to be divided to allow more than one SLCS and set of remote pendants to operate with overlapping wireless coverage. Because wireless bandwidth may be so severely limited, communication by SLCS's and remote pendants may be limited and or highly structured.

An SLCS may transmit a plurality of messages types, including an unpaired message, a pairing message, a normal operation message, a verbose error request message.

A remote pendant may transmit a plurality of messages types, including a pairing message, a normal operation message, a verbose error response message.

A plurality of remote pendants may authenticate or "pair" with an SLCS by providing an authentication credential; the authentication credential may comprise, for example, an identification number of the SLCS and or of the remote pendant, such as a serial number, a permanent identification number, a hardware address, a hardware key, a MAC address, a cryptographic key, a number or value or signature prepared using a shared private cryptographic key, a number or value or signature prepared using a private key of a public-private cryptographic key system, a number or value or signature prepared using a public key of a public-private cryptographic key system, a non-fungible token, and the like. The authentication credential may be "burned into" or stored in permanent secure memory in an SLCS and remote pendants with which the SLCS is meant to communicate with. The authentication credential may be a combination or product of two or more authentication credentials, such as a cryptographic hash of identification credentials for an SLCS and for a remote pendant.

During a pairing procedure, an SLCS may wirelessly transmit a message indicating that the SLCS is unpaired. A remote pendant may transmit a remote pendant message. The remote pendant message may be a pair attempt, comprising an authentication credential, such as a secure identifier or authentication credential of the SLCS and or of the remote pendant.

Because a non-transient authentication credential may comprise a relatively large amount of data, following authentication with the non-transient authentication credential, an SLCS or remote pendant may assign to the other device a transient authentication credential, wherein the transient authentication credential comprises a relatively small amount of data, compared to the non-transient authentication credential.

A paired or authenticated communication session may be maintained between an SLCS and a remote pendant while the SLCS and or remote pendant receive messages from the other without an interruption exceeding a timeout threshold. The timeout threshold may vary depending on the application of the SLCS. For example, for an SLCS controlling loads beneath a crane at a construction site, the timeout threshold may be ten minutes. For example, for an SLCS controlling a rescue litter beneath a helicopter, the timeout threshold may be two to five seconds.

When a plurality of pendants are paired with or available to pair with an SLCS, the SLCS may maintain a priority order among the plurality of pendants. The priority order may determine which remote pendant may provide a control input to the SLCS. The priority order may be based on, for example, an order in which remote pendants in the plurality of remote pendants pair with the SLCS, whether a remote pendant in the plurality of remote pendants is a master remote pendant, wherein the master remote pendant is to provide control input to the SLCS ahead of or to the exclusion of other remote pendants in the plurality of pendants. The priority order may further or alternatively be based on an input of a user of a remote pendant, such as selection of a lower priority, a higher priority, an equal or peer priority, and the like.

When a remote pendant has paired with an SLCS, is allowed to provide control input to the SLCS, and become a controlling remote pendant of the SLCS, the controlling remote pendant may release control of the SLCS. If a first remote pendant releases control of the SLCS and if a second remote pendant pairs with or is paired with the SLCS, the second remote pendant may thereafter or thereby accept control. The second remote pendant may be made aware that the SLCS is available to pair according to an unpaired message transmitted by the SLCS, according to an message indicating that another remote pendant has released control, and the like.

During normal operation messages, the SCLS may transmit information regarding the SLCS which is to be output by the remote pendant, such as a connection status of the SCLS, a transmit and or receive strength of wireless communication between the SLCS and remote pendant, an SLCS position and or orientation, a thrust output of the SLCS, an external force or perturbation on the SLCS, a battery status of the SLCS, and the like.

During normal operation messages, the remote pendant may transmit one or more remote pendant status and one or more remote pendant events. The remote pendent events may comprise, for example, a user selection of a user mode or command state of the load control system, e.g. idle, maintain relative location, position, and or orientation relative to the carrier, move to position, target mode, user designated position, obstacle avoidance, hold position or orientation, or direct control, an indication of a thrust vector to be output by the load control system, such as a value regarding a position of a joystick in the remote pendant, and the like.

During operation the SLCS and or remote pendant may identify that an error has occurred; errors may comprise, for example, a wireless communication loss, a wireless communication module error, an out-of-bounds control input instruction, a power supply error, or the like. When an error is detected, the SLCS may send a verbose error message request, wherein the verbose error message request requests that the remote pendant provide data from a system or subsystem which may be the subject of or related to the error.

Thereby, an SLCS enhances mission safety and improves performance of carrier and load operations as the SLCS dynamically controls fine location and yaw of a load, separate from motion of the carrier.

Thereby, an SCLS may communicate with a plurality of remote pendants and may manage or select which remote pendant of the plurality of remote pendants is to provide control input to the SLCS, such as based on a paired status, based on an order in which remote pendants paired with the SLCS, based on whether any of the remote pendants is a master pendant, based on whether a remote pendant has released control, based on a priority order among the plurality of remote pendants.

As disclosed herein, an SLCS controls the motion of a suspended load through a system that may be releasably secured to or incorporated into the suspended load or a structure that holds the suspended load. The SLCS is agnostic with respect to the platform from which the load is suspended (e.g., the characteristics of a helicopter "ownship", or a crane, etc., or other carrier), as it independently determines thrust necessary to stabilize the load or to direct the load in a desired direction. This permits widespread adoption of the system regardless of carrier type, lowering cost and mitigating solution risks.

An SLCS can provide benefits to, for example, helicopter search and rescue ("SAR") and sling load operations, forest fire helicopters, crane operations, construction sling load operations, and civilian firefighting.

An SLCS may be releasably secured to an existing structure designed to hold other loads, such as litters, cages, platforms, or the like or an SLCS may be integrated into a structures designed to hold other loads.

Reference is now made in detail to the description of the embodiments illustrated in the drawings. While embodiments are described in relation to the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein. For example, the embodiments set forth below are primarily described in the context of a helicopter sling load, search and rescue operations, and/or crane operations. However, these embodiments are illustrative examples and in no way limit the disclosed technology to any particular application or platform.

FIG. 1 illustrates a first schematic embodiment of suspended load control system (SLCS) 105, secure memory 122, SLCS wireless transmission 155, suspended load 140, suspension cable 130, crane hook and pivot 123, first remote pendant 125A, first remote pendant wireless transmission 150A, first remote pendant user 120A, first area 126A, second remote pendant 125B, second remote pendant wireless transmission 150B, second remote pendant user 120B, and second area 126B, an embodiment of a carrier, crane 110, all in construction site 100. A more detailed illustration of an SLCS used in a construction site may be found in FIG. 11 and SLCS 1100. A more detailed illustration of an embodiment of a remote pendant which may be used in a construction site may be found in FIG. 13 and remote pendant 1300.

An operator of crane 110 may need to pickup load 140 from first location 126A in construction site 100 and transport load 140 to second location 126B in construction site 100. First location 126A and second location 126B may be sufficiently far apart that remote pendant wireless transmission 150A cannot maintain a connection with SLCS 105 or first location 126A and second location 126B may be separated by a barrier, wherein the barrier may prevent visual contact by both remote pendant user 120A and remote pendant user 120B or the barrier may prevent first pendant wireless transmission 150A from reaching SLCS 105 when SLCS 105 is in or proximate to second area 126B.

Figure 3:
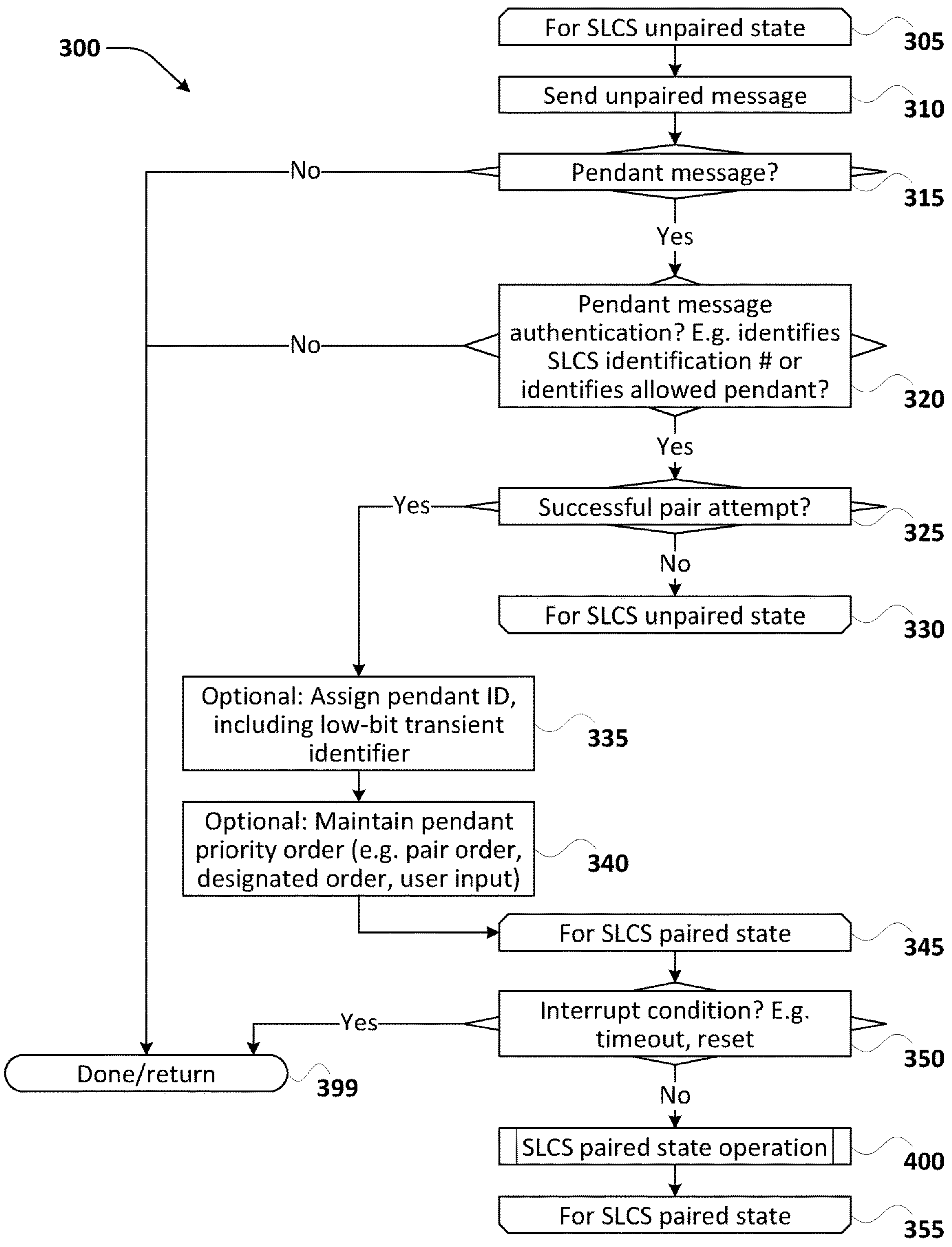
FIG. 3 illustrates logical flow of a suspended load control system multi-pendant management module, in accordance with one embodiment.
Figure 4:
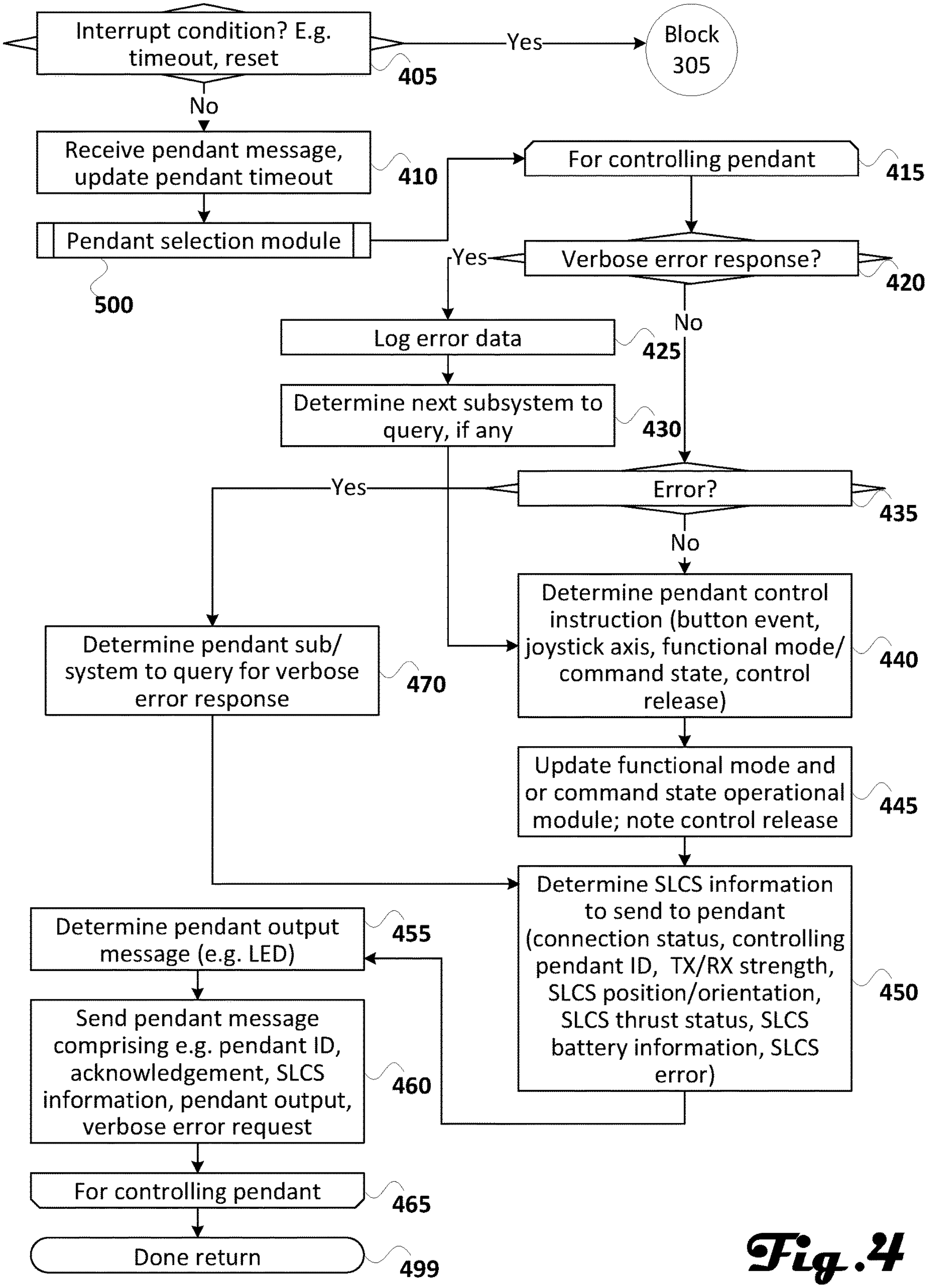
FIG. 4 illustrates logical flow of a suspended load control system paired state operation module, in accordance with one embodiment.
Figure 5:
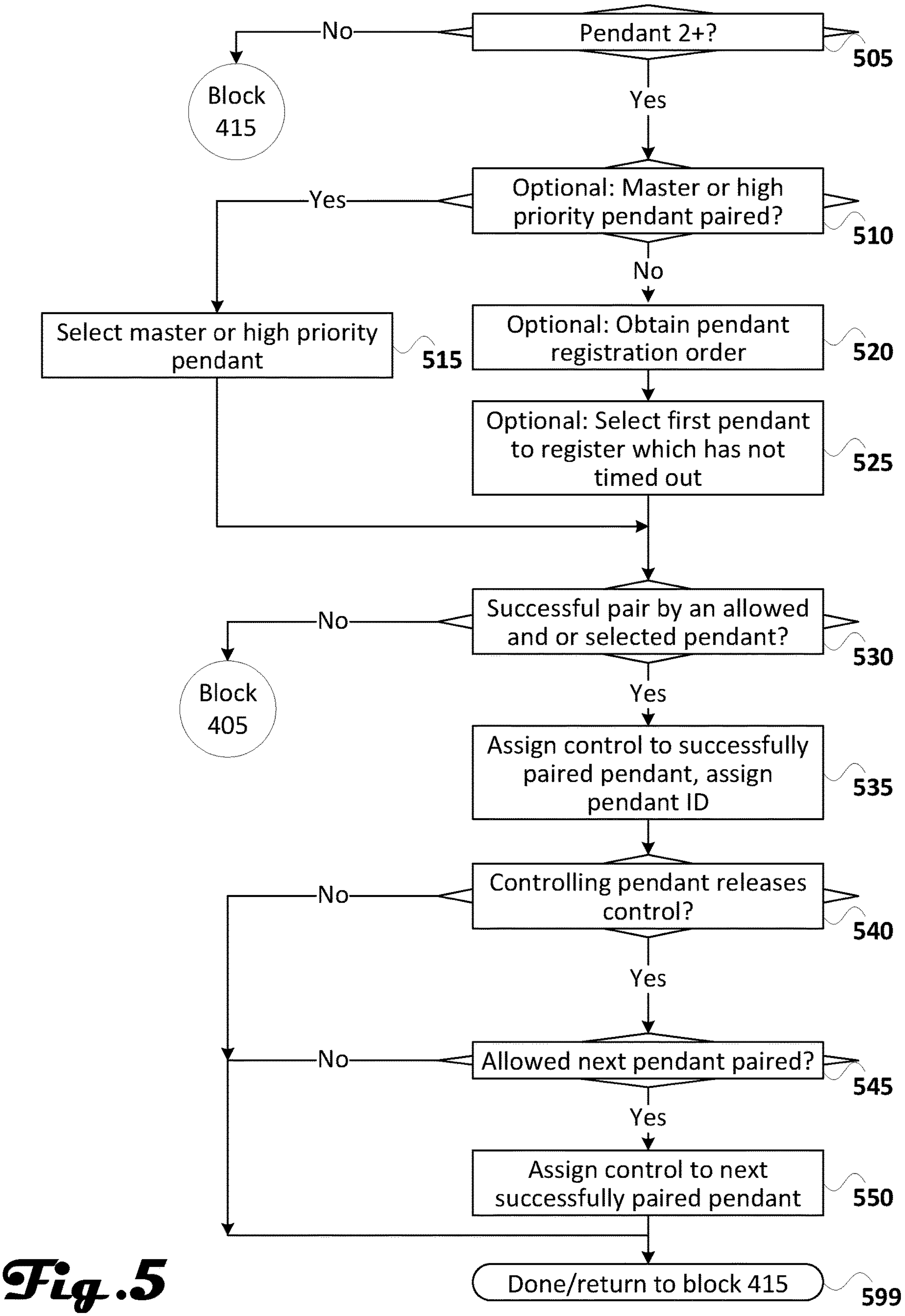
FIG. 5 illustrates logical flow of a controlling remote pendant selection module, in accordance with one embodiment.
Figure 7:
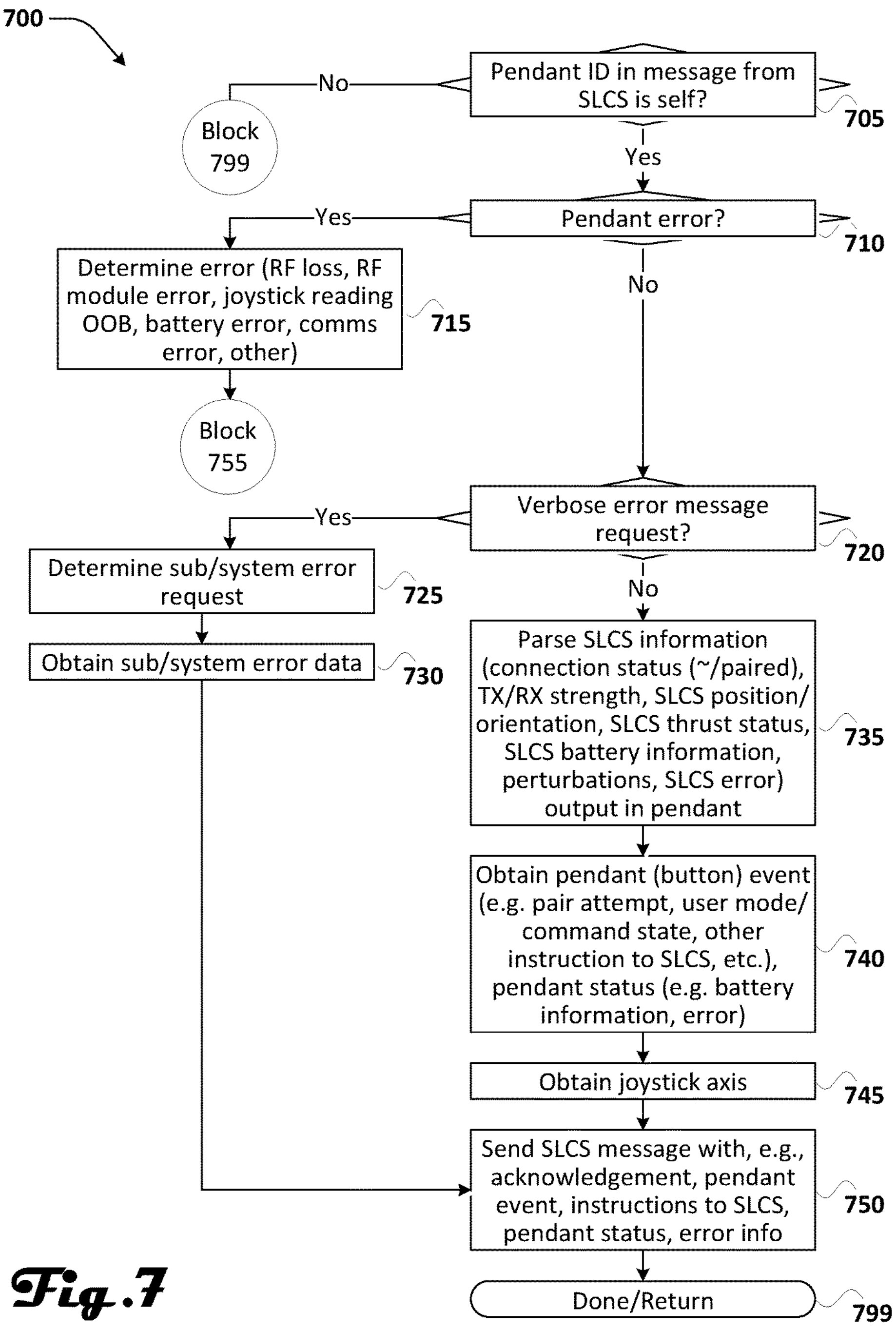
FIG. 7 illustrates logical flow of a remote pendant paired state operation module, in accordance with one embodiment.
Figure 8:
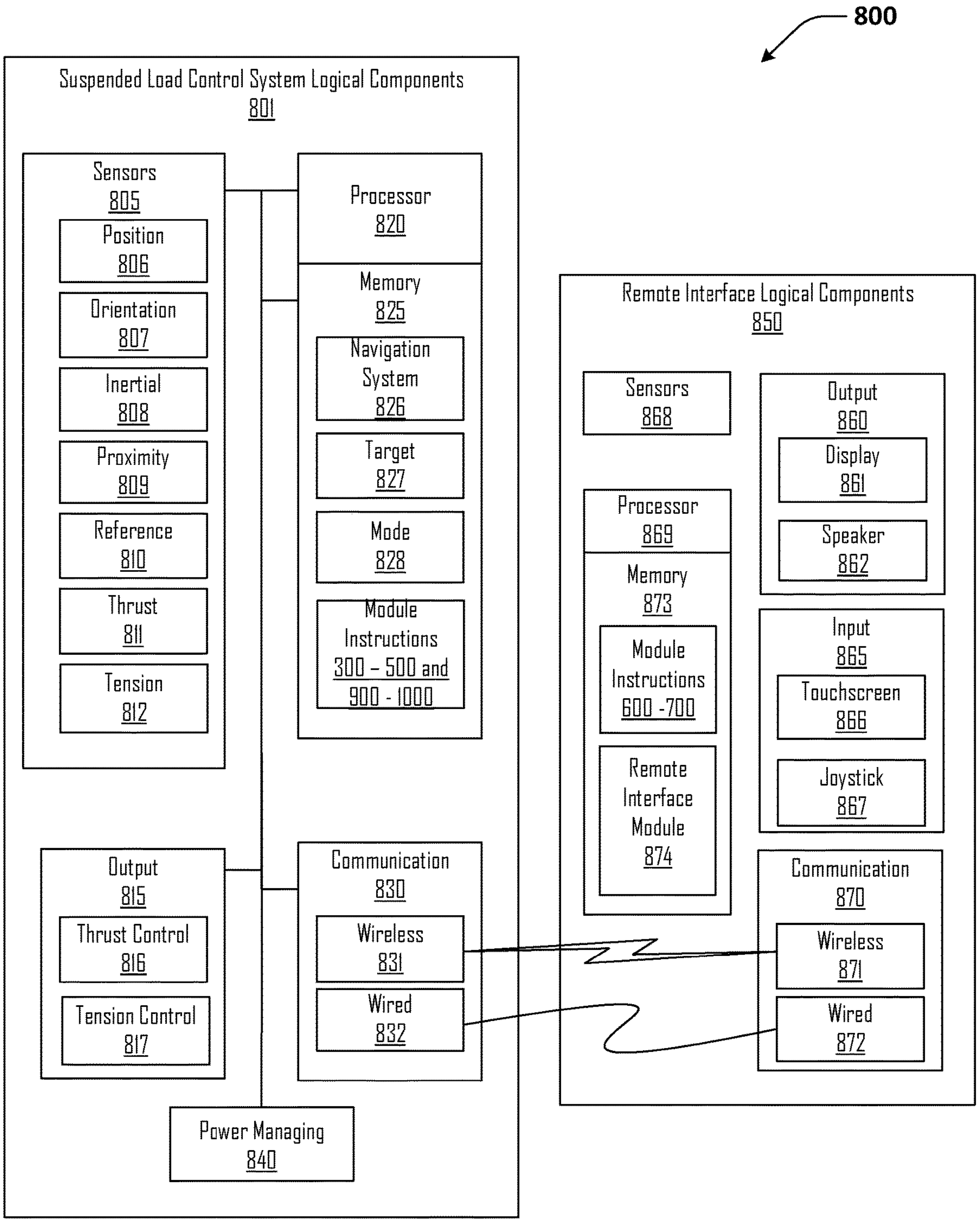
FIG. 8 schematically illustrates suspended load control system logical components and remote interface logical components in accordance with one embodiment.

To overcome these and other problems, SLCS 105 may comprise suspended load control system logical components 801 illustrated and discussed in relation to FIG. 8, including module instructions 300 to 500, e.g. suspended load control system multi-pendant management module 300 discussed in relation to FIG. 3, suspended load control system paired state operation module 400 discussed in relation to FIG. 4, and controlling remote pendant selection module 500 discussed in relation to FIG. 5. Further to overcome these problems, first remote pendant 125A and second remote pendant 125B may comprise remote interface logical components 850 illustrated and discussed in relation to FIG. 8, including module instructions 600 to 700, e.g. remote pendant multi-pendant management module 600 discussed in relation to FIG. 6 and remote pendant paired state operation module 700 discussed in relation to FIG. 7.

Figure 2:
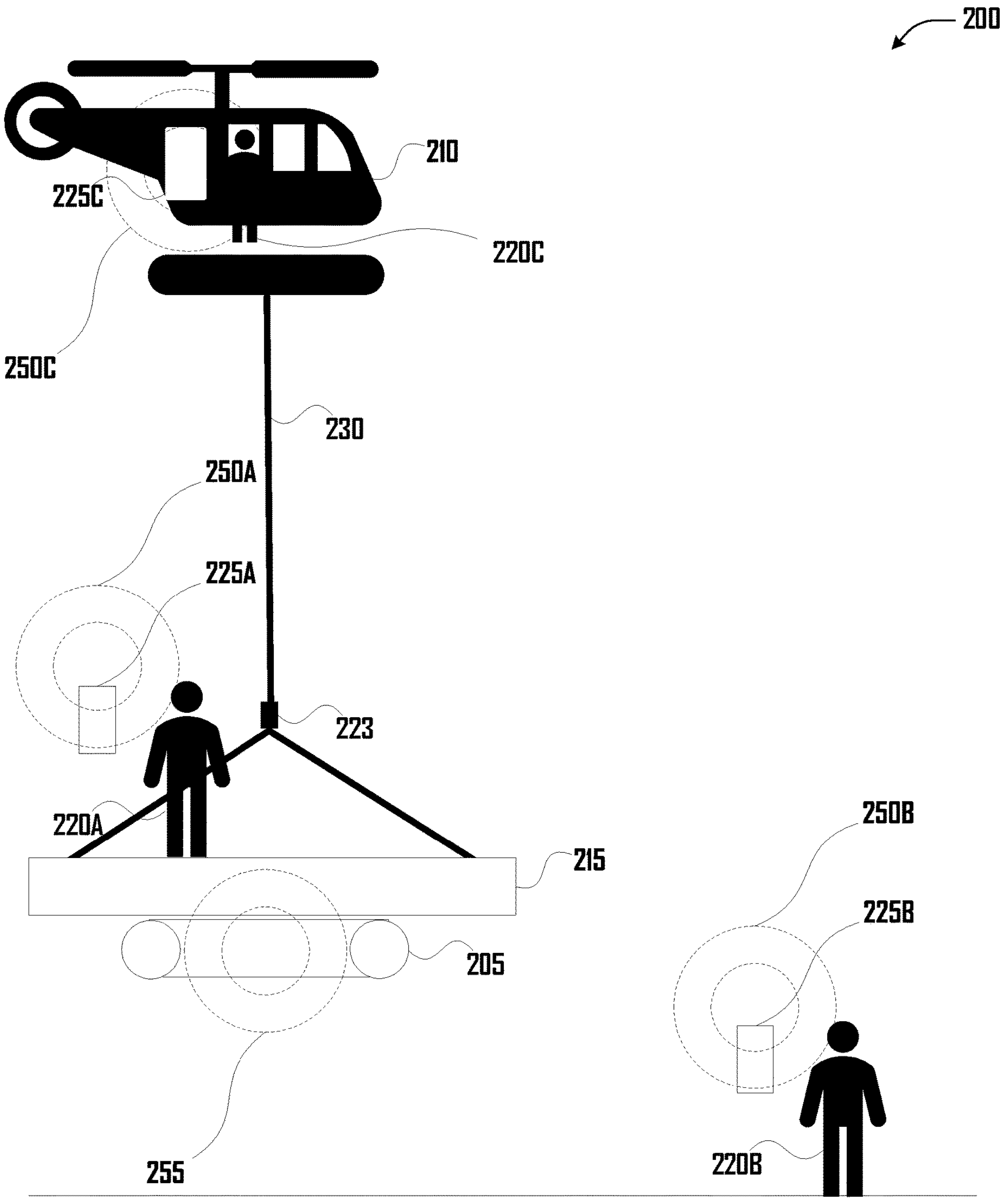
FIG. 2 is a view of a second embodiment of a suspended load control system, three remote pendants, and a second embodiment of a carrier, in accordance with an embodiment.

FIG. 2 illustrates a second schematic embodiment of suspended load control system (SLCS) 205, rescue litter 215, suspension cable 230, pivot 223, SLCS wireless transmission 255, first remote pendant 225A, first remote pendant wireless transmission 250A, first remote pendant user 220A, second remote pendant 225B, second remote pendant wireless transmission 250B, second remote pendant user 220B, third remote pendant 225C, third remote pendant wireless transmission 250C, and third remote pendant user 220C, an embodiment of a carrier, helicopter 210, all performing rescue operation 200. Rescue litter 215 may carry a person. First remote pendant user 220A may be secured to suspension cable 230, such as via a harness also clipped to pivot 223. First remote pendant user 220A may provide emergency medical services to the person in rescue litter 215. Second remote pendant user 220B may have helped first remote pendant user 220A load the person in rescue litter 215 and provided ground communication and ground support services in rescue operation 200. Third remote pendant user 220C may be in helicopter 210 and may, for example, operate a reel to reel-in suspension cable 230, to thereby transport the person in rescue litter 215 and first remote pendant user 220A into helicopter.

Figure 12:
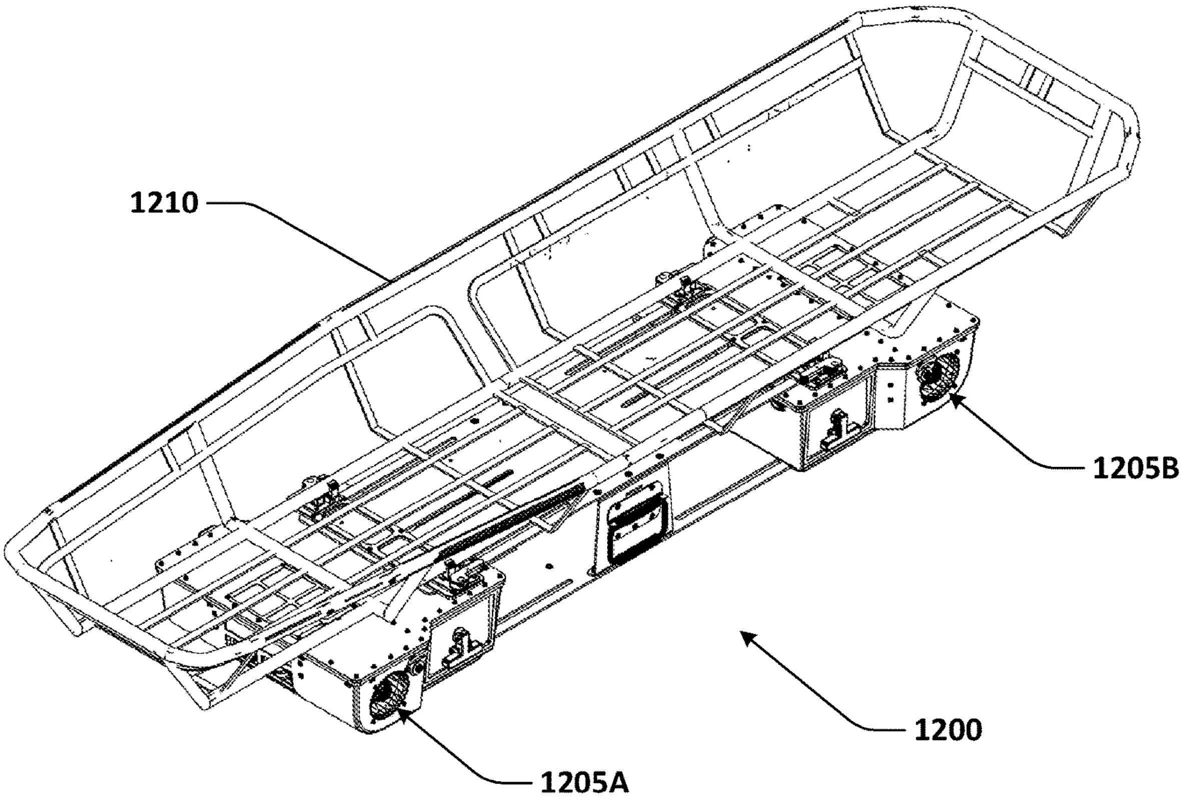
FIG. 12 illustrates an isomorphic parallel projection view of a suspended load control system secured to a litter, in accordance with an embodiment.

A more detailed illustration of an SLCS used in a rescue operation may be found in FIG. 12 and SLCS 1200. A more detailed illustration of an embodiment of a remote pendant which may be used in a rescue operation may be found in FIG. 14 and remote pendant 1400.

During a first phase of rescue operation 200, first remote pendant user 220A, second remote pendant user 220B, and third remote pendant user 220C may prefer that second remote pendant user 220B provide control input to SLCS 205. During a second phase of rescue operation 200, first remote pendant user 220A, second remote pendant user 220B, and third remote pendant user 220C may prefer that first remote pendant user 220A provide control input to SLCS 205. During a third phase of rescue operation 200, first remote pendant user 220A, second remote pendant user 220B, and third remote pendant user 220C may prefer that third remote pendant user 220C provide control input to SLCS 205. In addition, as rescue operation 200 is performed, SLCS 205 may move beyond a transmission range of second remote pendant 225B. Coordinating transfer of control among pendant users may exceed the unaided communication capabilities of first remote pendant user 220A, second remote pendant user 220B, and third remote pendant user 220C.

To overcome these and other problems, SLCS 205 may comprise suspended load control system logical components 801 illustrated and discussed in relation to FIG. 8, including module instructions 300 to 500, e.g. suspended load control system multi-pendant management module 300 discussed in relation to FIG. 3, suspended load control system paired state operation module 400 discussed in relation to FIG. 4, and controlling remote pendant selection module 500 discussed in relation to FIG. 5. Further to overcome these problems, first remote pendant 225A, second remote pendant 225B, and third remote pendant 225C may comprise remote interface logical components 850 illustrated and discussed in relation to FIG. 8, including module instructions 600 to 700, e.g. remote pendant multi-pendant management module 600 discussed in relation to FIG. 6 and remote pendant paired state operation module 700 discussed in relation to FIG. 7.

FIG. 3 illustrates logical flow of multi-pendant management module 300, in accordance with one embodiment. Instructions of, or which embody, multi-pendant management module 300 may be stored in, for example, memory 825, and may be executed or performed by, for example, processor 820, as well as by electrical circuits, firmware, and other computer and logical hardware of SLCS with which multi-pendant management module 300 may interact. In embodiments, computer processors and memory to perform some or all of multi-pendant management module 300 may be remote from SLCS, such as in an auxiliary computer in, for example, a carrier, in network provided computational resources, and the like.

Opening loop block 305 to closing loop block 330 may iterate while multi-pendant management module 300 is in an unpaired state.

At block 310, multi-pendant management module 300 may send an unpaired message. The unpaired message may comprise, for example, an identifier of an SLCS, such as an identifier of SLCS 1100 or SLCS 1300, an indication of the message type (e.g. a normal operation message, a register or authentication acknowledge message, an unpaired message type, a verbose error request, and the like), an indication that the SLCS is unpaired, an indication of the type of device sending the message (e.g. an SLCS or a remote pendant), a cyclic redundancy check, and the like.

At decision block 315, multi-pendant management module 300 may determine if it receives a message from a remote pendant. If negative or equivalent at decision block 315, including after waiting for a period (not illustrated), multi-pendant management module 300 may return to opening loop block 305, may return to a process which may have called it, or may conclude.

If affirmative or equivalent at decision block 315, at decision block 3250 multi-pendant management module 300 may determine if the pendant message is an authentication or pairing message. For example, a pairing message from a remote pendant may comprise an authentication credential; the authentication credential may comprise, for example, an identifier of an SLCS and or an identifier of a remote pendent. For example, an SLCS may be programmed, e.g. in secure non-volatile memory, with an identifier of a remote pendant with which the SLCS will pair or authenticate; a remote pendant may be programmed, e.g. in secure non-volatile memory, with an identifier of an SLCS with which the remote pendant will pair or authenticate. Each device may obtain its identifier and the identifier of the other device from its respective secure non-volatile memory and send the identifier pair or a product thereof, e.g. a cryptographic hash thereof, to the other party. Decision block 320 identifies this with the text "identifies SLCS identification number or identifies allowed pendant", wherein the SLCS identification number may be a identification number or authentication credential for the SLCS and the "allowed pendant" may be a identification number or authentication credential of a remote pendant with which multi-pendant management module 300 will pair or authenticate.

As discussed herein, A plurality of remote pendants may authenticate or "pair" with an SLCS by providing an authentication credential; the authentication credential may comprise, for example, an identification number of the SLCS and or of the remote pendant, such as a serial number, a permanent identification number, a hardware address, a hardware key, a MAC address, a cryptographic key, a number or value or signature prepared using a shared private cryptographic key, a number or value or signature prepared using a private key of a public-private cryptographic key system, a number or value or signature prepared using a public key of a public-private cryptographic key system, a non-fungible token, and the like. The authentication credential may be "burned into" or stored in permanent secure memory in an SLCS and remote pendants with which the SLCS is meant to communicate with. The authentication credential may be a combination or product of two or more authentication credentials, such as a cryptographic hash of identification credentials for an SLCS and for a remote pendant.

At decision block 325, multi-pendant management module 300 may determine if the pendant message comprises a successful pair or authentication attempt. If affirmative or equivalent at decision block 325, at block 335 multi-pendant management module 300 may optionally assign an identifier to the paired remote pendant of decision blocks 320 and 325, including a low-bit identifier, which may also be referred to as a transient identifier. A low-bit transient identifier may require relatively less data to be transmitted, compared to an identifier of the remote pendant; a low-bit transient identifier may also be less secure than an identifier of the remote pendant.

At block 340, multi-pendant management module 300 may maintain a priority order of remote pendants paired with or available to be paired with multi-pendant management module 300. The priority order may be based on, for example, the temporal order in which the remote pendants paired with multi-pendant management module 300, an order among remote pendants designated during system design and fabrication (e.g. whether a remote pendant is designated as having higher priority than one or more other remote pendants), a priority order based on user input into remote pendants (e.g. where users of remote pendants agree regarding a priority order and input the priority order into their respective remote pendant), and the like.

If negative or equivalent at decision block 325, at closing loop block 330 multi-pendant management module 300 may return to opening loop block 305.

Opening loop block 345 to closing loop block 355 may iterate while multi-pendant management module 300 is in a paired or authenticated state or condition.

At decision block 350, multi-pendant management module 300 may determine if an interrupt condition has occurred. An interrupt condition may comprise, for example, passage of a timeout interval, a reset of multi-pendant management module 300, e.g. following a power-cycle, or the like.

If affirmative or equivalent at decision block 350, at done or return block 399, multi-pendant management module 300 may conclude, may return to opening loop block 305, and or may return to a process which may have called it.

If negative or equivalent at decision block 350, at block 400, multi-pendant management module 300 may call, perform, or execute suspended load control system paired state operation module 400 as a subroutine or submodule, discussed herein in relation to FIG. 4.

At closing loop block 355, multi-pendant management module 300 may return to opening loop block 345 to iterate while multi-pendant management module 300 remains paired or authenticated with at least one remote pendant.

FIG. 4 illustrates suspended load control system paired state operation module 400, in accordance with one embodiment. Instructions of, or which embody, suspended load control system paired state operation module 400 may be stored in, for example, memory 825, and may be executed or performed by, for example, processor 820, as well as by electrical circuits, firmware, and other computer and logical hardware of SLCS with which suspended load control system paired state operation module 400 may interact. In embodiments, computer processors and memory to perform some or all of suspended load control system paired state operation module 400 may be remote from SLCS, such as in an auxiliary computer in, for example, a carrier, in network provided computational resources, and the like.

At decision block 405, suspended load control system paired state operation module 400 may determine if an interrupt condition has occurred. For example, an interrupt condition may comprise a timeout, a reset, or the like. If affirmative or equivalent at decision block 405, suspended load control system paired state operation module 400 may return to, for example, block 305 of multi-pendant management module 300.

If negative or equivalent at decision block 405, at block 410 suspended load control system paired state operation module 400 may receive a message from a remote pendant. The message may comprise, for example, a normal operation message, a verbose error response message, a pairing message, an error message, an unpaired remote pendant message, and the like. At block 410, suspended load control system paired state operation module 400 may update a timeout status of the remote pendant which sent the message received at block 410.

At block 500, suspended load control system paired state operation module 400 may call, perform, or execute controlling remote pendant selection module 500 as a subroutine or submodule, discussed herein in relation to FIG. 5. In overview, controlling remote pendant selection module 500 may determine whether more than one (a plurality) of remote pendants is paired with multi-pendant management module 300 and, if so, may determine which of the plurality of remote pendants is a controlling pendant, wherein the controlling pendant will provide control input to, for example, SLCS operational module 900 and or SLCS decision and thrust control module 1000.

Opening loop block 415 to closing loop block 465 may iterate while suspended load control system paired state operation module 400 has a constant controlling remote pendant. Messages received and sent by suspended load control system paired state operation module 400 between opening loop block 415 to closing loop block 465 may be to and from all of a plurality of remote pendants that are paired with multi-pendant management module 300, notwithstanding that only one of such pendants may be a controlling remote pendant.

At decision block 420, suspended load control system paired state operation module 400 may determine whether the remote pendant message of block 410 was a verbose error response message.

If affirmative or equivalent at decision block 420, at block 425 suspended load control system paired state operation module 400 may log error data provided in the verbose error response message.

At block 430 suspended load control system paired state operation module 400 may determine a next system or subsystem to query for error data, if any.

If negative or equivalent at decision block 420, at decision block 435 suspended load control system paired state operation module 400 may determine whether an error has occurred, e.g. in the SLCS, in a module of the SLCS, in a remote pendant, or the like. If affirmative or equivalent at decision block 435, at block 470 suspended load control system paired state operation module 400 may determine a remote pendant system or subsystem to query for a verbose error response If negative or equivalent at decision block 435, at block 440 suspended load control system paired state operation module 400 may determine a remote pendant control input or control instruction received in the remote pendant message of block 410. A remote pendant control input or control instruction may only be accepted from the controlling remote pendant. The control input may comprise, for example, an event in the remote pendant, such as a button press or a button event in the remote pendant, wherein the button press or event may comprise a selection of a functional mode or command state of SLCS operational module 900, a release of control by the controlling remote pendant, a joystick position or axis and (or other input), wherein the joystick position or axis may indicate a thrust vector (e.g. an orientation or direction of a thrust vector to be output by a thruster of the SCLS) and a thrust vector magnitude, or the like.

At block 445, suspended load control system paired state operation module 400 may update a functional mode or command state of SLCS operational module 900, may note the control release request, and the like.

At block 450 suspended load control system paired state operation module 400 may determine SLCS information to send to the remote pendant. For example, SLCS information may comprise a connection status (e.g. paired, not paired), an identifier of a controlling pendant (which may be output to both the controlling remote pendant and to other paired but not controlling remote pendants), a wireless communication transmit and or receive strength, a position and or orientation of the SLCS, a status of thrust from thrusters of the SLCS, a battery status information for a battery of the SLCS, an SLCS error, and the like.

At block 455 suspended load control system paired state operation module 400 may determine a message that the remote pendant is to output, e.g. to a user of the remote pendant, e.g. in user interface of the remote pendent, e.g. in a light-emitting diode, in a display screen, in an audio output, or the like. The message to be output may comprise some or all of the SLCS information of block 450 as well as other information to be provided by a module of the SLCS and output in the remote pendant, e.g. the functional mode or command state of SLCS operational module 900, and the like.

At block 460, suspended load control system paired state operation module 400 may send a remote pendant message comprising, for example, an identifier of the remote pendant (including a low-data transient identifier) to which the message is directed, an acknowledgement of the message of block 410, SLCS information of block 450, pendant output of block 455, a verbose error request message, and the like.

At closing loop block 465, suspended load control system paired state operation module 400 may return, for example, to block 415 or to block 410.

At done or return block 499, suspended load control system paired state operation module 400 may conclude or return to a process which may have called it, such as to multi-pendant management module 300.

FIG. 5 illustrates controlling remote pendant selection module 500, in accordance with one embodiment. Instructions of, or which embody, controlling remote pendant selection module 500 may be stored in, for example, memory 825, and may be executed or performed by, for example, processor 820, as well as by electrical circuits, firmware, and other computer and logical hardware of SLCS with which controlling remote pendant selection module 500 may interact. In embodiments, computer processors and memory to perform some or all of controlling remote pendant selection module 500 may be remote from SLCS, such as in an auxiliary computer in, for example, a carrier, in network provided computational resources, and the like.

At decision block 505, controlling remote pendant selection module 500 may determine if more than one pendant is paired or authenticated with suspended load control system multi-pendant management module 300 and or suspended load control system paired state operation module 400. If negative or equivalent at decision block 505, controlling remote pendant selection module 500 may return to, e.g. block 415, and may indicate that the one paired or authenticated remote pendant is the controlling pendant.

If affirmative or equivalent at decision block 505, at decision block 510 controlling remote pendant selection module 500 may optionally determine whether a "master" remote pendant or other pendant with higher priority relative to other paired pendants is paired. This determination may be based on, for example, a priority order, e.g. priority order maintained in block 340.

At block 515, controlling remote pendant selection module 500 may select the master or high priority remote pendant.

If negative or equivalent at decision block 510, at block 520 controlling remote pendant selection module 500 may optionally obtain a pendant authentication, pairing, or registration order (if, for example, priority order is not maintained in block 340).

At block 525, controlling remote pendant selection module 500 may optionally select a first remote pendant to authenticate, pair, or register, which has not also timed out.

At decision block 530, controlling remote pendant selection module 500 may determine whether there has been a successful authentication or pair by an allowed and or selected remote pendant, wherein the selected remote pendant is a remote pendant selected at block 515 or block 525. If negative or equivalent at decision block 530, controlling remote pendant selection module 500 may return to, for example, block 405.

If affirmative or equivalent at decision block 530, at block 535 controlling remote pendant selection module 500 may assign control to the successfully paired and selected pendant. At block 535 controlling remote pendant selection module 500 may further assign a pendant identifier, such as a low data transient identifier, to the remote pendant which has been assigned control.

At decision block 540, controlling remote pendant selection module 500 may determine whether the controlling pendant of block 535 has released control.

If affirmative or equivalent at decision block 540, at decision block 545 controlling remote pendant selection module 500 may determine whether an allowed pendant, e.g. another pendant allowed to pair with suspended load control system multi-pendant management module 300 is already paired with suspended load control system multi-pendant management module 300.

If affirmative or equivalent at decision block 545, at block 550 controlling remote pendant selection module 500 may assign control (to provide control input to SLCS operational module 900 and or SLCS decision and thrust control module 1000) to the next successfully paired remote pendant.

If negative or equivalent at decision block 540 or at decision block 545, or following block 550, controlling remote pendant selection module 500 may proceed to done or return block 599. In done or return block 599, controlling remote pendant selection module 500 may return the controlling pendant of, e.g., block 515, block 535, or of block 550.

Figure 6:
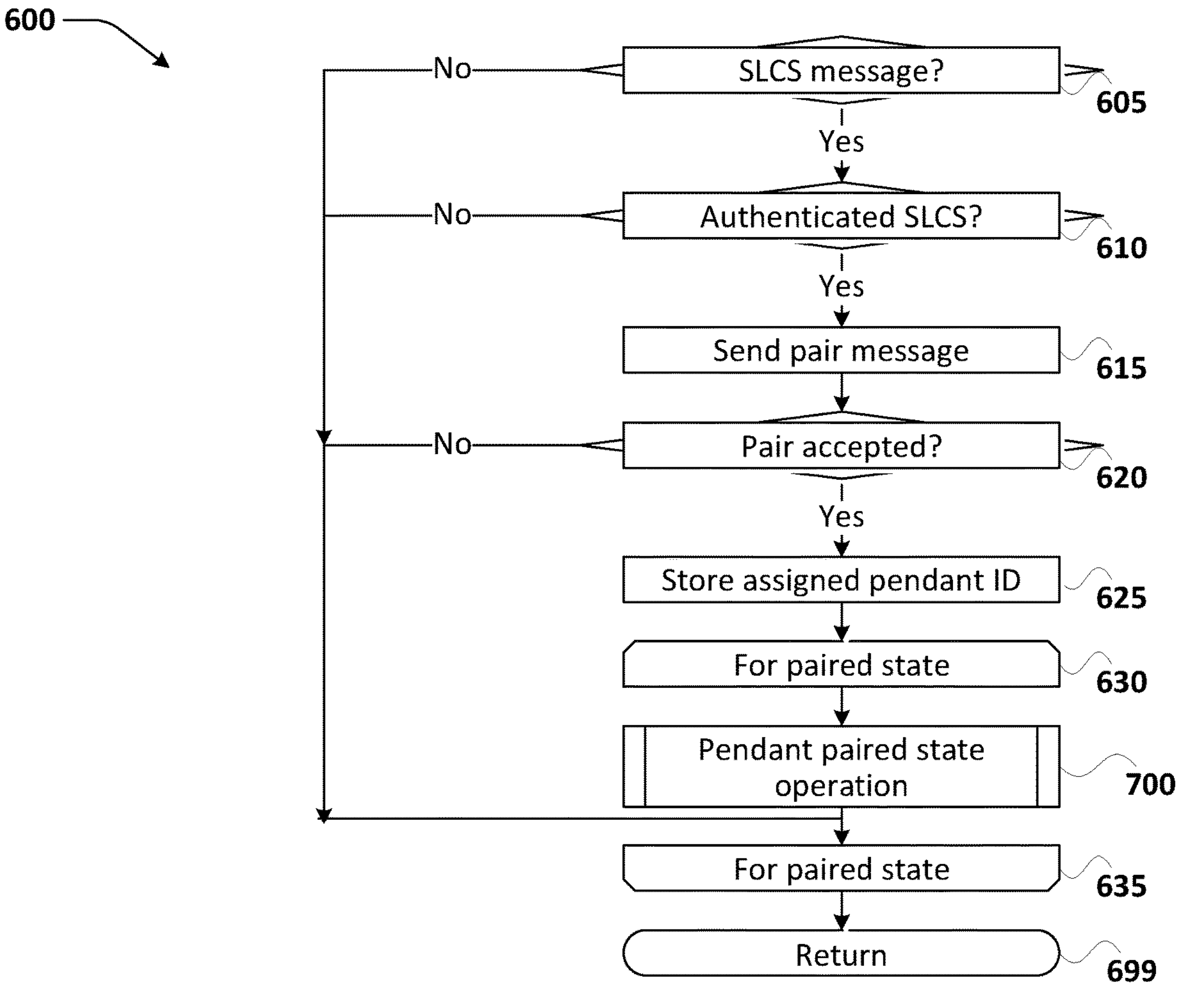
FIG. 6 illustrates logical flow of a remote pendant multi-pendant management module, in accordance with one embodiment.

FIG. 6 illustrates remote pendant multi-pendant management module 600, in accordance with one embodiment. Instructions of, or which embody, remote pendant multi-pendant management module 600 may be stored in, for example, memory 873, and may be executed or performed by, for example, processor 869, as well as by electrical circuits, firmware, and other computer and logical hardware of a remote pendant with which remote pendant multi-pendant management module 600 may interact. In embodiments, computer processors and memory to perform some or all of remote pendant multi-pendant management module 600 may be remote from the remote pendant, such as in an auxiliary computer in, for example, an SLCS, in a carrier, in network provided computational resources, and the like.

At decision block 605, remote pendant multi-pendant management module 600 may determine whether it has received a message from an SLCS. Determination of whether a received message may be based on, for example, whether the received message indicates that the source of the message is an SLCS.

At decision block 610, remote pendant multi-pendant management module 600 may determine whether the received message is from an authenticated SLCS, e.g. an SLCS with which the remote pendant executing remote pendant multi-pendant management module 600 is configured to pair or authenticate with. This determination may be based on whether the received message comprises an authentication credential of an SLCS with which the remote pendant executing remote pendant multi-pendant management module 600 is configured to pair or authenticate with. For example, the remote pendant may comprise secure non-volatile memory comprising an authentication credential of or associated with an SLCS with which remote pendant multi-pendant management module 600 may pair. Such memory and credential may be accessed and the authentication credential confirmed at decision block 610.

If affirmative or equivalent at decision block 605, at block 615, remote pendant multi-pendant management module 600 may send a pair message. The pair message may indicate that the message is a pair message, may indicate the source of the message (e.g. that the message is from a remote pendant), may comprise an authentication credential for the remote pendant executing remote pendant multi-pendant management module 600 (e.g. an identifier of the remote pendant), and a cyclic redundancy check.

At decision block 620, remote pendant multi-pendant management module 600 may determine whether the pair message of block 615 is accepted. Acceptance of the pair message may be indicated by an indication of acceptance in the received message, by an identification number assigned to the remote pendant executing remote pendant multi-pendant management module 600, such as a low-bit transient identification number, and the like.

If affirmative or equivalent at decision block 620, at block 625 remote pendant multi-pendant management module 600 may store an assigned identification number in memory, such as in memory 873.

Opening loop block 630 to closing loop block 635 may iterate while remote pendant multi-pendant management module 600 is in a paired or authenticated state with an SLCS.

At block 700, remote pendant multi-pendant management module 600 may call, perform, or execute remote pendant paired state operation module 700 as a subroutine or sub-module, discussed herein in relation to FIG. 7.

At closing block 635, while remote pendant paired state operation module 700 remains paired or authenticated with an SLCS, remote pendant multi-pendant management module 600 may return to opening loop block 630.

Following an interrupt condition, such as a timeout condition, a power-cycle, a de-pair indication, or the like, remote pendant multi-pendant management module 600 may proceed to done or return block 699 and may conclude and or return to a process which may have called it.

FIG. 7 illustrates remote pendant paired state operation module 700, in accordance with one embodiment. Instructions of, or which embody, remote pendant paired state operation module 700 may be stored in, for example, memory 873, and may be executed or performed by, for example, processor 869, as well as by electrical circuits, firmware, and other computer and logical hardware of a remote pendant with which remote pendant paired state operation module 700 may interact. In embodiments, computer processors and memory to perform some or all of remote pendant paired state operation module 700 may be remote from the remote pendant, such as in an auxiliary computer in, for example, an SLCS, in a carrier, in network provided computational resources, and the like.

At decision block 705, remote pendant paired state operation module 700 may determine if an identifier or credential in the received message is an identifier of or associated with the remote pendant, such as an authentication credential and or a low-bit transient identifier stored, for example, in block 625.

If affirmative or equivalent at decision block 705, at decision block 710 remote pendant paired state operation module 700 may determine if a remote pendant error has occurred. If affirmative or equivalent, at block 715, remote pendant paired state operation module 700 may determine the error, such as a wireless communication loss, a wireless communication module error, an out-of-bounds control input instruction, a power supply error, or the like.

At decision block 720, remote pendant paired state operation module 700 may determine if a verbose error message request was received.

If affirmative or equivalent at decision block 720, at block 725 remote pendant paired state operation module 700 may determine a system or subsystem identified in the verbose error request.

At block 730, remote pendant paired state operation module 700 may obtain error regarding the identified system or subsystem.

If negative or equivalent at decision block 720, at block 735 remote pendant paired state operation module 700 may parse the message to obtain SLCS information and information that is to be output in a user-interface of the remote pendant. SLCS information may comprise, for example, such as a connection status of the SCLS, a transmit and or receive strength of wireless communication between the SLCS and remote pendant, an SLCS position and or orientation, a thrust output of the SLCS, an external force or perturbation on the SLCS, a battery status of the SLCS, and the like.

At block 740, remote pendant paired state operation module 700 may obtain remote pendant events and remote pendant status information. The remote pendent events may comprise, for example, a user selection of a user mode or command state of the load control system, e.g. idle, maintain relative location, position, and or orientation relative to the carrier, move to position, target mode, user designated position, obstacle avoidance, hold position or orientation, or direct control, a release of control, and the like. Remote pendant status may comprise, for example, a battery or power supply status, an error, a connection status, and the like.

At block 745, remote pendant paired state operation module 700 may obtain a an indication of a thrust vector to be output by the load control system, such as a value regarding a position of a joystick in the remote pendant.

At block 750, remote pendant paired state operation module 700 may send a message to the SLCS with, for example, an acknowledgement of an SLCS message, a pendant event, control input or instructions to the SLCS, remote pendant status, error data, and the like.

At done or return block 799, remote pendant paired state operation module 700 may conclude and or return to a process which may have called it.

FIG. 8 schematically illustrates suspended load control system logical components 801 and remote interface logical components 850 in accordance with one embodiment. Within load control system logical components 801 are sensor suite 805, which may include position sensors 806, orientation sensors 807, inertial sensors 808, proximity sensors 809, reference location sensors 810, thrust sensors 811, and cameras.

The SLCS processing capacity 820 includes a computer processor and microcontrollers. SLCS memory 825 generally comprises a random-access memory ("RAM") and permanent non-transitory mass storage device, such as a solid-state drive, and contains navigation systems 826, target data 827, mode or command state information 828, and software or firmware code, instructions, or logic for one or more of suspended load control system multi-pendant management module 300, suspended load control system paired state operation module 400, controlling remote pendant selection module 500, operational module 900 and suspended load control decision and thrust control module 1000. Communication systems 830 include wireless systems 831 such as a wireless transceiver, and wired systems 832. SLCS output 815 includes thrust control 816 via power controllers or ESCs. Power management systems 840 regulate and distribute the power supply from, e.g., batteries or a wired power supply. A data bus couples the various internal systems and logical components of load control system logical components 801.

An interactive display, remote interface, remote pendant, remote positional unit, or target node (herein also referred to as a "remote pendant") may be a computational unit comprising one or more of remote interface logical components 850; such a unit may be self-powered and carried by a person, e.g. remote pendant 1300 or remote pendant 1400, or hardwired into an airframe. The remote interface logical components 850 receive data from and/or send data to the SLCS, e.g., wirelessly. The data from the SLCS may be displayed in display 861 of remote interface logical components 850; the computational data is parsed and converted to visual, audio, or haptic cues. Remote interface logical components 850 may also communicate to the SLCS the operator's desired command states and operational instructions, as discussed herein.

Remote interface logical components 850 may be in communication with load control system logical components 801 via communication systems 870, which may be wireless 871 or wired 872. Output 860 from remote interface logical components 850 may include information displayed on a screen or display 861, and auditory cues or access to remote audio (such as audio detected by sensors in a load) via audio output 862. Input 865 to remote interface logical components 850 to control a remote pendant or an SLCS may include commands conveyed through touchscreen 866, joystick 867 or other input interface. In various embodiments, remote interface logical components 850 may comprise one or more physical and/or logical devices that collectively provide the functionalities described herein.

Aspects of the system may be embodied in a specialized or special purpose computing device or data processor that is specifically programmed, configured, or constructed to perform one or more of the computer-executable instructions explained in detail herein, in conjunction with suitable memory. Aspects of the system may also be practiced in distributed computing environments where tasks or modules are performed by remote processing devices and memory that are linked through a communications network, such as a local area network (LAN), wide area network (WAN), or the Internet. In a distributed computing environment, modules may be located in both local and remote memory storage devices. As schematically illustrated in FIG. 8, load control system logical components 801 and remote interface logical components 850 are coupled by a wired or wireless network.

Load control system logical components 801 may work with a remote positional unit, remote interface, or target node comprising one or more remote interface logical components 850, in accordance with one embodiment. The remote positional unit, remote interface, or target node may comprise an internal or external sensor suite, such as sensors 868, configured to communicate, such as wirelessly, with load control system logical components 801 as a positional reference. Sensors 868 may be similar to sensors 805. If sensors 805 are considered the primary sensor suite, a secondary sensor suite location may be the platform or carrier from which a suspension cable is suspended, sensors 868 in or in communication with remote interface logical components 850, and a tertiary sensor suite location may be a location of interest for the load (e.g., for positioning to obtain or deliver the load). Remote interface logical components 850 may further comprise processor 869 and memory 873, which may be similar to processor 820 and memory 825. Memory 873 may comprise software or firmware code, instructions, or logic for one or more modules used by the remote positional unit, remote interface, or target node, such as remote interface module 874. For example, remote interface module 874 may provide control and interface for a remote positional unit, remote interface, or target node, such as to allow it to be turned on/off, to pair it with an SLCS, to input instructions, or the like.

A remote pendant may include a transceiver configured to communicate with load control system logical components 801 via a wireless transceiver and provide a position reference. For example, a remote pendant may be secured to a helicopter ownship or crane below which the load is suspended and/or a remote pendant may be secured to a load.

In some embodiments, the remote pendant may be made of durable polymer or plastic, sized to fit into a hand. The remote pendant may have an external antenna. The remote positional unit, remote interface, or target node may be secured to, e.g., the helicopter by magnets, bolts, or any other securement mechanism. The remote pendant may be dropped to a location on the ground or secured to, e.g., a life preserver or other flotational device, a rescuer, a load to be picked up, a location for a load to be delivered, or an operational specific location.

Aspects of the load control system logical components 801 and/or remote interface logical components 850 may be embodied in a specialized or special purpose computing device or data processor that is specifically programmed, configured, or constructed to perform one or more of the computer-executable instructions explained in detail herein. Aspects of the load control system logical components 801 and/or remote interface logical components 850 may also be practiced in distributed computing environments where tasks or modules are performed by remote processing devices that are linked through a communications network, such as a local area network (LAN), wide area network (WAN), or the Internet. In a distributed computing environment, modules may be located in both local and remote memory storage devices. As schematically illustrated in FIG. 8, load control system logical components 801 and remote interface logical components 850 may be coupled by a wired or wireless network.

Figure 9:
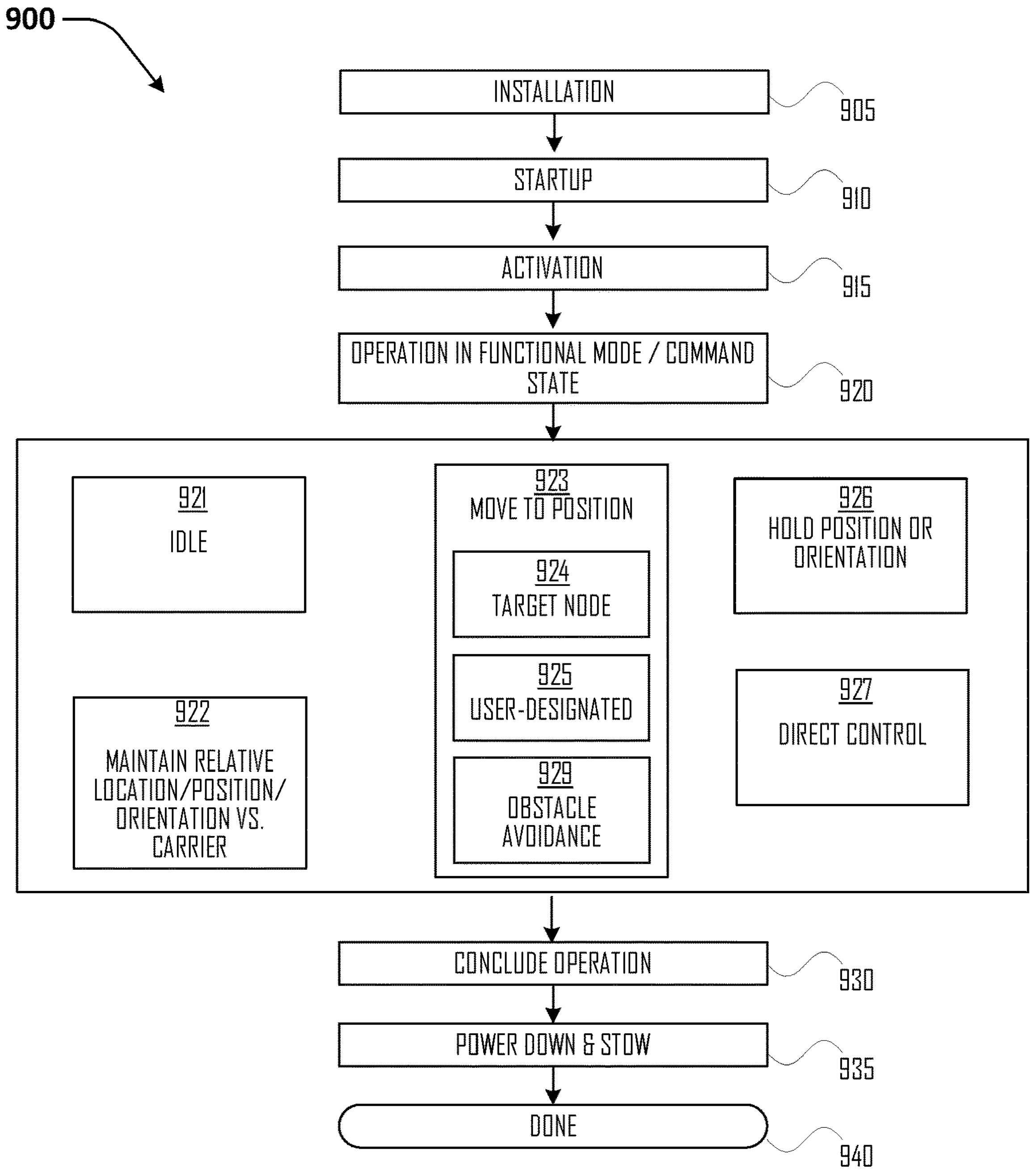
FIG. 9 illustrates a suspended load control system operational module including multiple modes or command states in accordance with one embodiment.

FIG. 9 illustrates an example of operational module 900 of a suspended load control system ("SLCS") including multiple mode or command state modules in accordance with one embodiment. Instructions of, or which embody, decision and operational module 900 may be stored in, for example, memory 825, and may be executed or performed by, for example, processor 820, as well as by electrical circuits, firmware, and other computer and logical hardware of SLCS with which operational module 900 may interact. In embodiments, computer processors and memory to perform some or all of operational module 900 may be remote from SLCS, such as in an auxiliary computer in, for example, a carrier.

In block 905, an SLCS apparatus may be installed onto a load and/or onto a cable from which a load will be suspended. The SLCS apparatus need not be powered on for installation.

In block 910, the SLCS in the apparatus may be started up and operational module 900 activated. In some embodiments, operational module 900 may be initialized by the press of a button located on a face of a control module of the SLCS. Near the accessible external button which may initialize operational module 900, another button may be present that allows for immediate shut down when pressed. In addition to the initialization interface on the center or control module, operational module 900 may also be initialized by an operator not directly next to the system. One or more external operators, including but not limited to a rescuer on the end of the cable, may initialize operational module 900 by pressing a button on one or more remote interface linked wirelessly to operational module 900. One or more modules of a complete SLCS, such as physically separated control unit, remote pendant, fan unit, and the like, may be started up in block 910 and may be paired to function together. During block 910, operational module 900 may determine a relative orientation of fan units which operational module 900 is to control. This determination may be based on sensor information from the fan units, such as a compass heading sampled from each fan unit. This determination may be performed to adjust for fan units which are not parallel to one another, as may be the case when a modular SLCS is deployed on an irregular load, such as a rope or webbing enclosed load, and the fan units may not be parallel. This determination may be used in block 1030, with respect to fan mapping. This determination may not be necessary when the SLCS is in a rigid frame and the fan units may be presumed to be parallel to one another. This determination may produce an error condition if the fan units are not within an acceptable orientation range.

In block 915, operational module 900 is activated in and/or receives a functional mode or command state selected by the operator. In block 920, operational module 900 may perform or call suspended load control decision and thrust control module 1000 as a subroutine or submodule, to implement a functional mode or command state. The functional modes or command states of the system are:

Idle mode 921: internal systems of the SLCS are operating (e.g., operational module 900 observes motion of the SLCS and calculates corrective action), but the thrusters are shut off or maintain an idle speed only, without action to affect the motion of the load.

Maintain relative position vs. ownship mode 922: stabilizes the SLCS with respect to a slung origin point. For example, when SLCS is suspended with a load below a helicopter, SLCS will stay directly below the helicopter. Maintain relative position vs. ownship mode 922 localizes the ownship motion and performs the corrective actions necessary to critically damp any other suspended load motion. If the ownship is traveling at a low speed, maintain relative position vs. ownship mode 922 will couple the velocity so the two entities are moving in unison. Upon a disturbance to the load, maintain relative position vs. ownship mode 922 provides thrust in the direction of the disturbance to counteract the disturbance, eliminating the swing.

Move to/stop at position mode 923: will stabilize an SLCS to a fixed position, counteracting the influence of the weather or small movements of the helicopter or other suspending platform. This mode has the effect of killing all motion. The operator may send the desired target position to SLCS via a remote interface. This may be accomplished in at least two ways:

Target node position 924: The operator may place reference location sensors 868 at the desired lowering location (e.g., location 126B of FIG. 1). Reference location sensors 868 may communicate wirelessly with target node position 924 module to indicate the desired position, and target node position 924 module responds by maneuvering the SLCS to the desired location. Remote interface display 861 may receive and display the location information of both entities.

User-designated position/orientation 925: The operator may use the remote interface display 861 to send a designated position (e.g., latitude and longitude coordinates) or orientation as a commanded location to user-designated position/orientation 925 module. The system will then steadily direct the suspended load to the desired position or to the desired orientation. The system will simultaneously send feedback to remote interface logical components 850 regarding position, distance, and orientation information.

Hold position mode 926: will resist all motion of an SLCS and maintain current position and/or orientation independent of the ownship's motion. This module has the effect of killing all motion. This module has conditional responses respectively to ownship speed, safety factors, and physical constraints.

Direct control mode 927: Joystick operation of an SLCS in three degrees of freedom. Though operational module 900 is entirely closed loop and does not require external control during operation, there is an option for user control. The operator is able to provide input to direct control mode 927 module, e.g. through a joystick, to directly control positioning, rotation, and thruster output level.

Obstacle avoidance module 929: receives and processes sensor information such as to i) to equalize the distance between sensor locations, such as at fan units, and objects, such as obstacles, sensed in the environment or ii) to measure or receive geometry of a load, measure geometry of obstacles sensed in the environment, determine or receive the position, orientation, and motion of the load, and negotiate the load relative to the obstacle.

In block 930, the operator completes the operation and retrieves SLCS.

In block 935, operational module 900 may be shut down by pushing a button on the interactive display or by pressing the button on the center module of the SLCS apparatus. If the SLCS apparatus includes collapsible frame, propulsion arms or fan units, they may be folded up. If the SLCS apparatus includes removable modules, such as for fan units, a housing, a power supply housing, and the like, the modules may be removed from a load, disassembled. The load may be detached from a load hook or the like, and then a suspension cable may be detached from a hoist ring at the top of the load and/or SLCS. SLCS may then be stowed in or electrically connected to charger and/or any suitable location.

Figure 10:
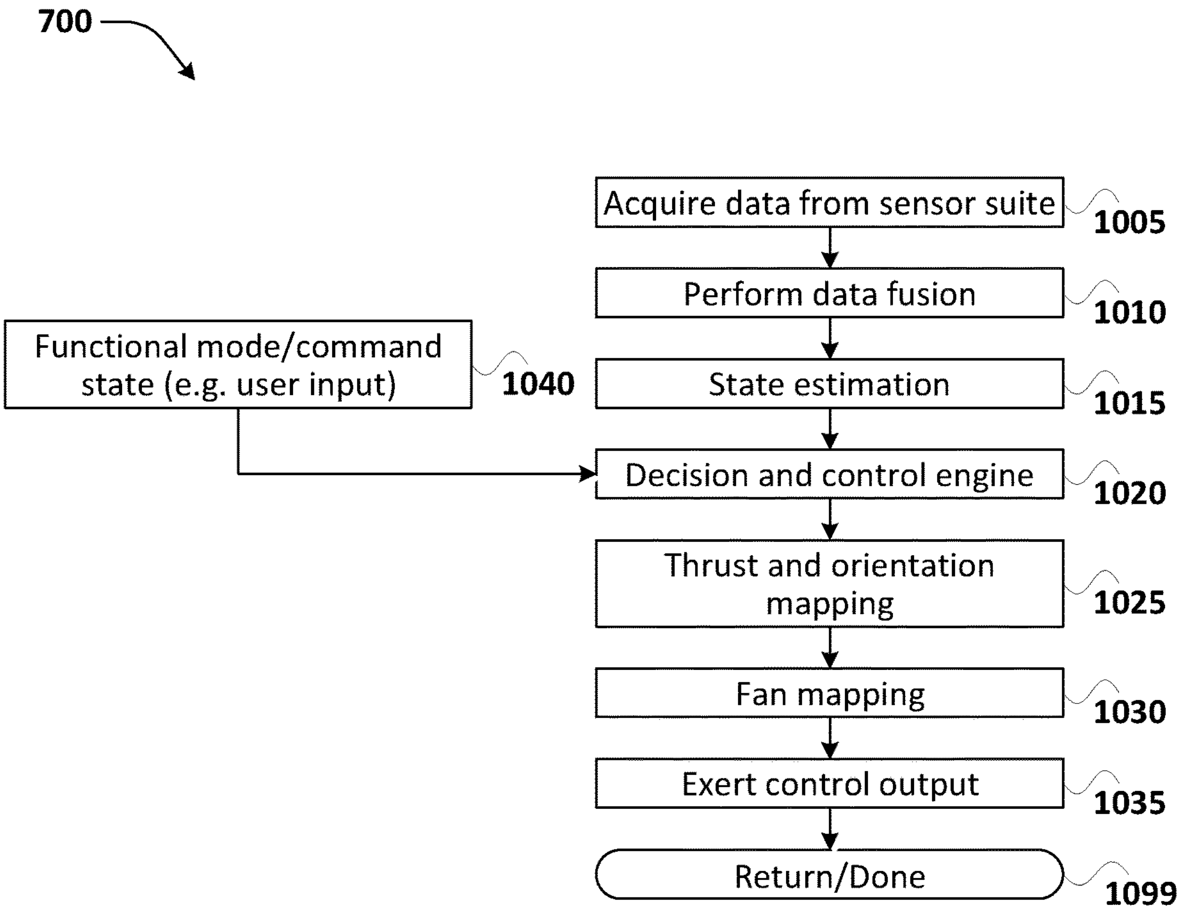
FIG. 10 illustrates a suspended load control system decision and thrust control module in accordance with one embodiment.

FIG. 10 illustrates decision and thrust control module 1000 of a suspended load control system in accordance with one embodiment. Instructions of, or which embody, decision and thrust control module 1000 may be stored in, for example, memory 825, and may be executed or performed by, for example, processor 820, as well as by electrical circuits, firmware, and other computer and logical hardware of SLCS with which decision and thrust control module 1000 may interact. In embodiments, computer processors and memory to perform some or all of decision and thrust control module 1000 may be remote from SLCS, such as in an auxiliary computer in, for example, a carrier.

Decision and thrust control module 1000 may operate in a closed loop to understand its position and motion in near real time, determine a most desired system response, and send desired response(s) to the air propulsion system thruster array to mitigate swing of the cable or otherwise control a load during operations At block 1005, decision and thrust control module 1000 may obtain data from sensors such as, for example, sensors 805, such as accelerometer, gyroscope, magnetometer, GPS, lidar/radar, machine vision, and/or range finders.

In block 1010, decision and thrust control module 1000 combines data from the sensors to obtain a data fusion describing position, orientation, motion, and environment of the SLCS apparatus.

Sensor data is fused and filtered by the SLCS through nonlinear flavors of a Kalman Filter, e.g. an extended Kalman Filter, an unscented Kalman Filter, to yield an accurate representation of the system's state. Closed-loop control methods including fuzzy-tuned proportional, integral, and derivative feedback controllers have bidirectional communication with advanced control methods including deep learning neural nets and future propagated nonlinear Kalman filters, allowing for further real-time system identification.

In block 1015, decision and thrust control module 1000 performs state estimation using non-linear state estimators, e.g. a nonlinear Kalman Filter, to project near-term future motion based on the data fusion and on feedback from the decision and control engine to the state estimator.

In block 1017, decision and thrust control module 1000 receives a functional mode selection, such as according to user input.

In block 1020, decision and thrust control module 1000 takes the state estimation 1015, informed by the user-selected functional mode or command state 1040 (which may be provided from block 920), as well as additional feedback from the thrust and orientation mapping 1025 and output control 1035, and determines a desired direction of motion or rotation of the SLCS.

Algorithmic output is sent to motion or power controllers, such as electronic speed controllers (ESCs), which will send the desired thrust response to the EDF via, for example phase control of pulse modulated power signals. The net thrust output is mapped in real-time through encoders and load cells then sent back to decision and control block 1020 and onward for closed-loop control.

In block 1025, decision and thrust control module 1000 maps desired orientation with thrust vectors from EDF to generate a thrust and orientation mapping to achieve the determined thrust and orientation of the SLCS apparatus.

In block 1030, decision and thrust control module 1000 maps the thrust and orientation mapping to fans and fan thrust vectors and generates a fan mapping to control EDFs to achieve the desired thrust and orientation of the SLCS.

In block 1035, decision and thrust control module 1000 applies the fan mapping to output power control signals to the fans or thrusters (or electronic components controlling the same) to achieve the determined thrust and orientation of the SLCS apparatus, exerting commanded control output and implementing a dynamic response in the form of thrust from the fans.

At done block 1099, decision and thrust control module 1000 may conclude or return to a module which may have called it.

Decision and thrust control module 1000 may be unmanned and automated aside from the high-level operator-selected functional control modes. Net output is a control force to move or stabilize a suspended load.

Figure 11:
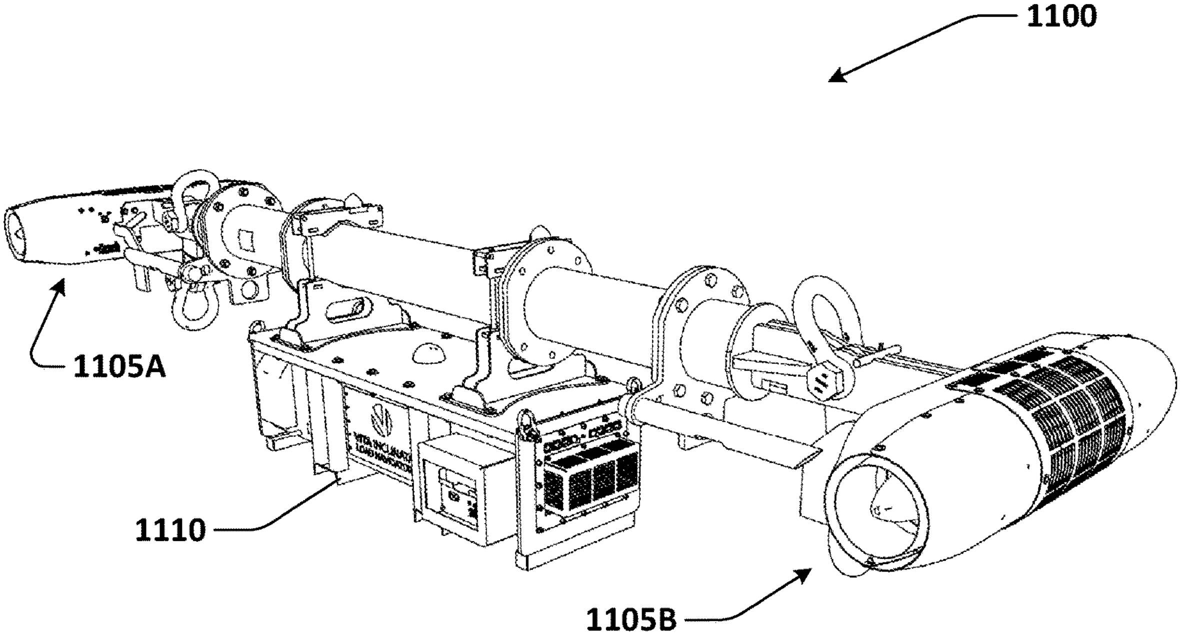
FIG. 11 illustrates an oblique perspective view of a suspended load control system on a spreader beam, in accordance with an embodiment.

FIG. 11 illustrates an oblique perspective view of SLCS 1100 on a spreader beam, in accordance with an embodiment. SLCS 1100 comprises thruster 1105A and thruster 1105B, which may comprise EDFs. Electronics box 1110 may comprise suspended load control system logical components 801.

FIG. 12 illustrates an isomorphic parallel projection view of SLCS 1200 secured to litter 1210, in accordance with an embodiment. SLCS 1200 comprises thruster 1205A and thruster 1205B, which may comprise EDFs. Within SLCS 1200 may be suspended load control system logical components 801.

Figure 13:
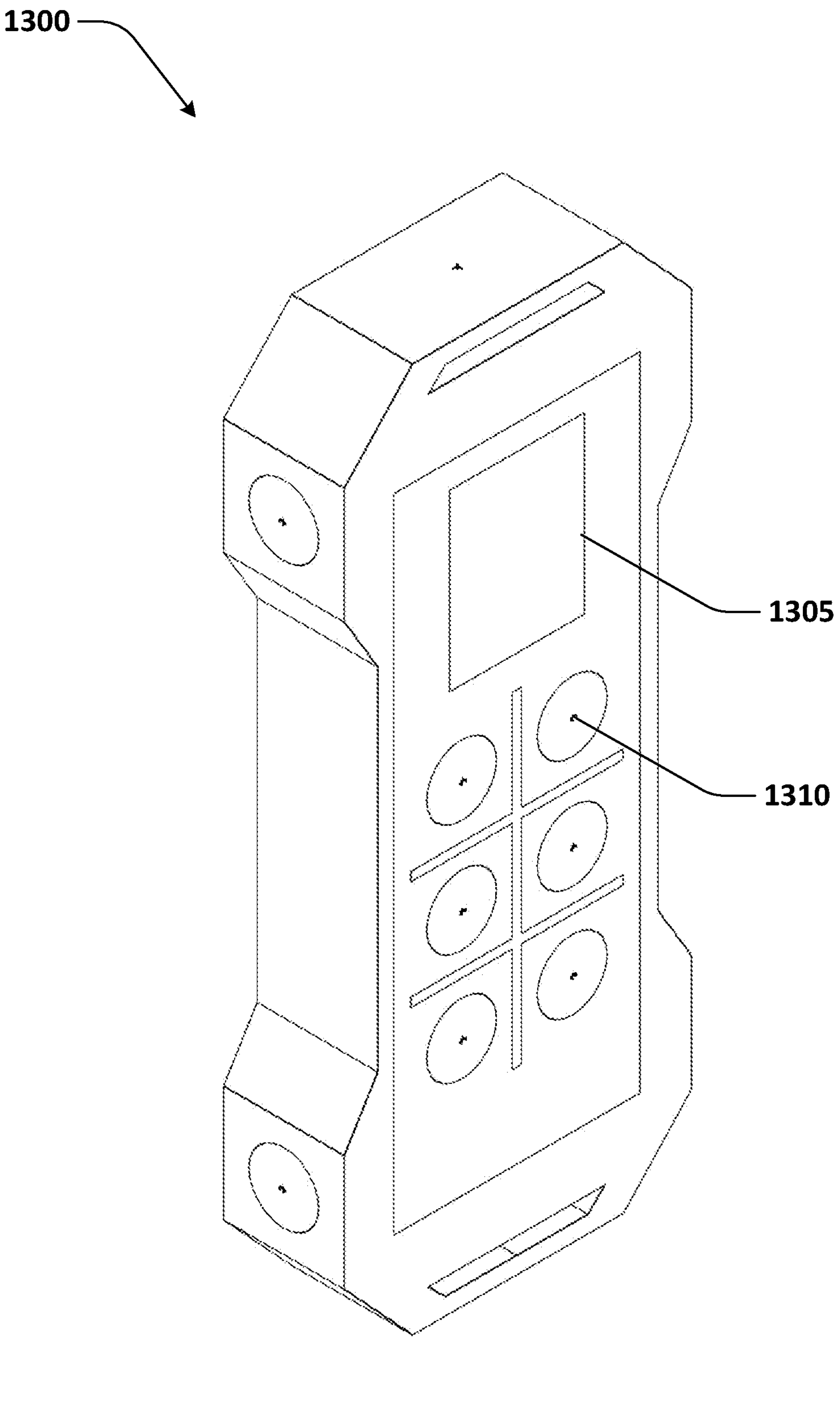
FIG. 13 illustrates a remote pendant for a suspended load control system, in accordance with a first embodiment.

FIG. 13 illustrates remote pendant 1300 for an SLCS, in accordance with a first embodiment. Remote pendant 1300 may comprise remote interface logical components 850, including output 850 in display 1305 and input 865 in button 1310.

Figure 14:
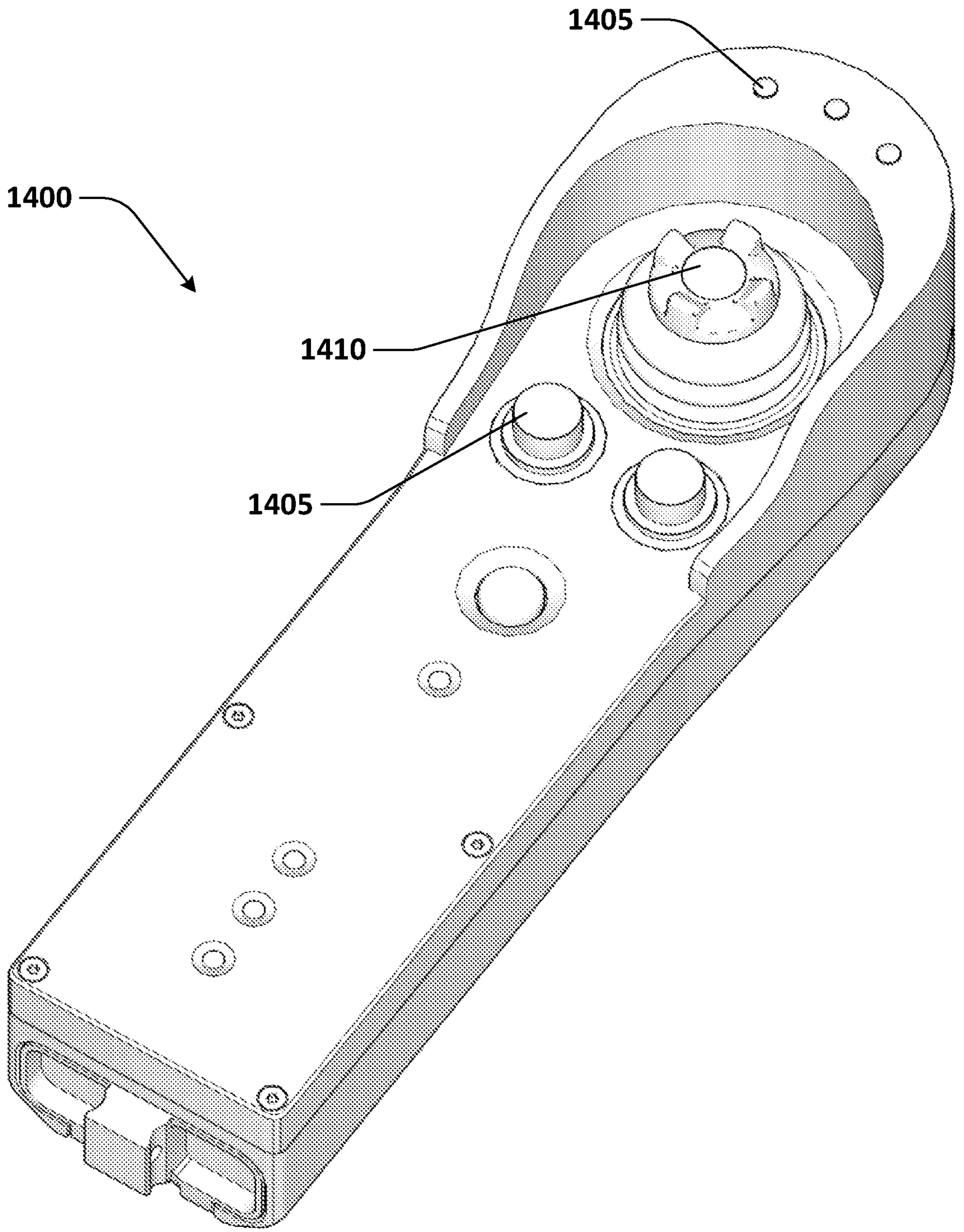
FIG. 14 illustrates a remote pendant for a suspended load control system, in accordance with a second embodiment.

FIG. 14 illustrates remote pendant 1400 for an SLCS, in accordance with a second embodiment. Remote pendant 1400 may comprise remote interface logical components 850, including output 850 in LEDs 1405 and input 865 in button 1410 (additional buttons are illustrated and not labeled) and joystick 1410.

Although specific embodiments have been illustrated and described herein, it will be appreciated by those of ordinary skill in the art that alternate and/or equivalent implementations may be substituted for the specific embodiments shown and described without departing from the scope of the present disclosure. This application is intended to cover any adaptations or variations of the embodiments discussed herein.

Following are non-limiting examples.

Example 1. A load control system to influence at least one of a position, orientation, or motion of a load suspended by a cable from a carrier, comprising: at least one thruster, a sensor suite, a computer processor, and a computer memory, wherein the computer memory comprises a suspended load control module and a multi-pendant management module; wherein, when executed by the computer processor, the multi-pendant management module is to determine which of a first remote pendant and a second remote pendant is to provide a control input to the suspended load control module; and wherein, when executed by the computer processor, the suspended load control module is to receive the control input, determine a position, orientation, or motion of the load based on a sensor data from the sensor suite, and, in response to the control input, is to cause the at least one thruster to influence at least one of the position, orientation, or motion of the load.

Example 2. The load control system according to Example 1, wherein to determine which of the first remote pendant and the second remote pendant is to provide the control input to the suspended load control module, the multi-pendant module is to determine that at least one of the first remote pendant and the second remote pendant is authenticated with respect to the load control system.

Example 3. The load control system according to Example 2, wherein the load control system further comprises a wireless communication system, wherein the wireless communication system is to receive at least one of a first message from the first remote pendant and a second message from the second remote pendant; and wherein to determine that at least one of the first remote pendant and the second remote pendant is authenticated with respect to the load control system, the multi-pendant management module is further to determine that at least one of the first message and the second message comprises an authentication credential.

Example 4. The load control system according to Example 3, wherein the authentication credential comprises at least one of an identifier of the load control system and an identifier of an authenticated remote pendant.

Example 5. The load control system according to Example 4, wherein at least one of the identifier of the load control system or the identifier of the authenticated remote pendant is stored in a non-volatile memory of at least one of the load control system, a non-volatile memory of the first remote pendant, or a non-volatile memory of the second pendant.

Example 6. The load control system according to Example 2, wherein the multi-pendant module is to determine that at least one of the first remote pendant and the second remote pendant is authenticated with respect to the load control system according to a non-transient secure identifier of an authenticated remote pendant and is to assign a transient identifier of an authenticated remote pendant to at least one of the first remote pendant and the second remote pendant.

Example 7. The load control system according to Example 6, wherein the transient identifier of the authenticated remote pendant comprises fewer data bits than the non-transient secure identifier of the authenticated remote pendant.

Example 8. The load control system according to Example 1, wherein to determine which of the first remote pendant and the second remote pendant is to provide the control input to the suspended load control module, the multi-pendant module is to allow a first remote pendant to authenticate with the multi-pendant management module to provide the control input to the suspended load control module.

Example 9. The load control system according to Example 1, wherein the multi-pendant management module is to maintain a priority order among the first remote pendant and the second remote pendant, wherein to determine which of the first remote pendant and the second remote pendant is to provide the control input to the suspended load control module is based at least in part on the priority order, wherein to maintain the priority order among the first remote pendant and the second remote pendant, the multi-pendant management module is to maintain a list of remote pendants which have authenticated with the multi-pendent management module.

Example 10. The load control system according to Example 9, wherein the multi-pendent management module is further to order the list of remote pendants which have authenticated with the multi-pendent management module based on at least one of an authentication order among the remote pendants which have authenticated with the multi-pendent management module and a user input regarding priority order.

Example 11. The load control system according to Example 9, wherein the multi-pendent management module is further to remove a remote pendant from the list of remote pendants which have authenticated with the multi-pendent management module based on a timeout interval.

Example 12. The load control system according to Example 1, wherein to determine which of the first remote pendant and the second remote pendant is to provide the control input to the suspended load control module, the multi-pendant module is to determine that one of the first remote pendant and the second remote pendant is a master remote pendant and is to provide the control input from the master remote pendant to the suspended load control module.

Example 13. The load control system according to Example 1, wherein the multi-pendant management module is to determine that an authenticated session with a remote pendant which has not timed out and is to determine which of the first remote pendant and the second remote pendant are to provide a control input to the suspended load control module based at least in part on the authenticated session with the remote pendant which has not timed out.

Example 14. The load control system according to Example 1, wherein the multi-pendant management module is further to transmit an identity of a controlling remote pendant, wherein the controlling remote pendant is one of the first remote pendant or the second remote pendant determined to provide the control input to the suspended load control module.

Example 15. The load control system according to Example 14, wherein the identity of the controlling remote pendant is the first remote pendant and wherein the multi-pendant management module is further to determine that the first remote pendant has released a right to be the controlling remote pendant.

Example 16. The load control system according to Example 15, wherein the multi-pendant management module is further to determine that the second remote pendant is authenticated with respect to the load control system and is to provide the control input from the second remote pendant to the suspended load control module.

Example 17. The load control system according to Example 1, wherein the multi-pendant management module is to determine that an error has occurred and is to request at least one of the first remote pendant and the second remote pendant to provide an error response.

Example 18. The load control system according to Example 17, wherein the error comprises one of a wireless communication loss, a wireless communication module error, an out-of-bounds control input instruction, or a power supply error and wherein the error response comprises an error data from a subsystem or system of at least one of the first remote pendant and the second remote pendant.

Example 19. The load control system according to Example 1, wherein the control input comprises at least one of a remote pendant status and a remote pendant event.

Example 20. The load control system according to Example 19, wherein the remote pendant event comprises at least one of a user selection of a user mode or command state of the load control system and an indication of a thrust vector to be output by the load control system.

Example 21. The load control system according to Example 19, wherein the remote pendant status comprises at least one of a power supply status and a remote pendant error.

Example 22. The load control system according to Example 1, wherein the suspended load control module determines the position, orientation, or motion by combining the sensor data from the sensor suite through a non-linear filter to determine a current state, wherein the suspended load control module further projects near-term future motion based on the current state with feedback from at least one of a functional mode or command state of an operational module, a thrust and orientation mapping, or a fan mapping.

Example 23. A method to influence at least one of a position, orientation, or motion of a load suspended by a cable from a carrier with a load control apparatus, comprising: the load control apparatus comprising least one thruster of the load control apparatus, a sensor suite, a computer processor, and a computer memory; determining which of a first remote pendant and a second remote pendant is to provide a control input to the load control apparatus, wherein the control input is to control a thrust vector produced by the at least one thruster; receiving the control input; determining a position, orientation, or motion of the load based on a sensor data from the sensor suite, and, in response to the control input, producing the thruster vector to influence at least one of the position, orientation, or motion of the load.

Example 24. The method according to Example 23, wherein determining which of the first remote pendant and the second remote pendant is to provide the control input comprises determining that at least one of the first remote pendant and the second remote pendant is authenticated.

Example 25. The method according to Example 24, further comprising receiving with a wireless communication system at least one of a first message from the first remote pendant and a second message from the second remote pendant; and wherein determining that at least one of the first remote pendant and the second remote pendant is authenticated comprises determining that at least one of the first message and the second message comprises an authentication credential.

Example 26. The method according to Example 25, wherein the authentication credential comprises at least one of an identifier of the load control apparatus and an identifier of an authenticated remote pendant.

Example 27. The method according to Example 26, further comprising obtaining at least one of the identifier of the load control apparatus or the identifier of the authenticated remote pendant from a non-volatile memory of at least one of the load control apparatus, a non-volatile memory of the first remote pendant, or a non-volatile memory of the second pendant.

Example 28. The method according to Example 23, further comprising determining that at least one of the first remote pendant and the second remote pendant is authenticated with respect to the load control apparatus according to non-transient secure identifier of an authenticated remote pendant and assigning a transient identifier of an authenticated remote pendant to at least one of the first remote pendant and the second remote pendant.

Example 29. The method according to Example 28, wherein the transient identifier of the authenticated remote pendant comprises fewer data bits than the non-transient secure identifier of the authenticated remote pendant.

Example 30. The method according to Example 23, wherein determining which of the first remote pendant and the second remote pendant is to provide the control input to the suspended load control apparatus comprises allowing a first remote pendant to authenticate to provide the control input to the suspended load control apparatus.

Example 31. The method according to Example 23, further comprising maintaining a priority order among the first remote pendant and the second remote pendant, wherein maintaining the priority order among the first remote pendant and the second remote pendant comprises maintaining a list of remote pendants which have authenticated with the load control apparatus.

Example 32. The method according to Example 31, further comprising ordering the list of remote pendants which have authenticated with the multi-pendent management module based on at least one of an authentication order among the remote pendants which have authenticated with the multi-pendent management module and a user input regarding priority order.

Example 33. The method according to Example 31, further comprising removing a remote pendant from the list of remote pendants which have authenticated with the multi-pendent management module based on a timeout interval.

Example 34. The method according to Example 23, wherein determining which of the first remote pendant and the second remote pendant is to provide the control input to the suspended load control apparatus comprises determining that one of the first remote pendant and the second remote pendant is a master remote pendant and providing the control input from the master remote pendant to the suspended load control apparatus.

Example 35. The method according to Example 23, further comprising determining that an authenticated session with a remote pendant which has not timed out and determining which of the first remote pendant and the second remote pendant are to provide the control input to the suspended load control apparatus based at least in part on the authenticated session with the remote pendant which has not timed out.

Example 36. The method according to Example 23, further comprising transmitting an identity of a controlling remote pendant, wherein the controlling remote pendant is one of the first remote pendant or the second remote pendant determined to provide the control input to the suspended load control module.

Example 37. The method according to Example 36, wherein the identity of the controlling remote pendant is associated with the first remote pendant and further comprising determining that the first remote pendant has released a right to be the controlling remote pendant.

Example 38. The method according to Example 37, further comprising determining that the second remote pendant is authenticated with respect to the load control apparatus and providing the control input from the second remote pendant to the suspended load control apparatus.

Example 39. The method according to Example 23, further comprising determining that an error has occurred and requesting at least one of the first remote pendant and the second remote pendant to provide an error response.

Example 40. The method according to Example 39, wherein the error comprises one of a wireless communication loss, a wireless communication module error, an out-of-bounds control input instruction, or a power supply error and wherein the error response comprises an error data from a subsystem or system of at least one of the first remote pendant and the second remote pendant.

Example 41. The method according to Example 23, wherein the control input comprises at least one of a remote pendant status and a remote pendant event.

Example 42. The method according to Example 41, wherein the remote pendant event comprises at least one of a user selection of a user mode or command state of the load control system and an indication of a thrust vector to be output by the load control system.

Example 43. The method according to Example 41, wherein the remote pendant status comprises at least one of a power supply status and a remote pendant error.

Example 44. The method according to Example 23, wherein determining the position, orientation, or motion of the load based on the sensor data from the sensor suite comprises combining the sensor data from the sensor suite through a non-linear filter to determine a current state and wherein producing the thruster vector to influence at least one of the position, orientation, or motion of the load comprises projecting near-term future motion based on the current state with feedback from at least one of a functional mode or command state of an operational module, a thrust and orientation mapping, or a fan mapping.

Example 45. An apparatus to influence at least one of a position, orientation, or motion of a load suspended by a cable from a carrier, comprising: means comprising a computer processor and computer memory to determine which of a first remote pendant and a second remote pendant is to provide a control input to the load control apparatus, wherein the control input is to control a thrust vector produced by the at least one thruster; means to receive the control input; means to determine a position, orientation, or motion of the load based on a sensor data from the sensor suite, and, in response to the control input, means to produce the thruster vector to influence at least one of the position, orientation, or motion of the load.

Example 46. The apparatus according to Example 45, wherein means to determine which of the first remote pendant and the second remote pendant is to provide the control input comprises means to determine that at least one of the first remote pendant and the second remote pendant is authenticated.

Example 47. The apparatus according to Example 45, further comprising means to receive with a wireless communication system at least one of a first message from the first remote pendant and a second message from the second remote pendant; and wherein means to determine that at least one of the first remote pendant and the second remote pendant is authenticated comprises means to determine that at least one of the first message and the second message comprises an authentication credential.

Example 48. The apparatus according to Example 47, wherein the authentication credential comprises at least one of an identifier of the load control apparatus and an identifier of an authenticated remote pendant.

Example 49. The apparatus according to Example 48, further comprising means to obtain at least one of the identifier of the load control apparatus or the identifier of the authenticated remote pendant from a non-volatile memory of at least one of the load control apparatus, a non-volatile memory of the first remote pendant, or a non-volatile memory of the second pendant.

Example 50. The apparatus according to Example 45, further comprising means to determine that at least one of the first remote pendant and the second remote pendant is authenticated with respect to the load control apparatus according to non-transient secure identifier of an authenticated remote pendant and means to assign a transient identifier of an authenticated remote pendant to at least one of the first remote pendant and the second remote pendant.

Example 51. The apparatus according to Example 50, wherein the transient identifier of the authenticated remote pendant comprises fewer data bits than the non-transient secure identifier of the authenticated remote pendant.

Example 52. The apparatus according to Example 45, wherein means to determine which of the first remote pendant and the second remote pendant is to provide the control input to the suspended load control apparatus comprises means to allow a first remote pendant to authenticate with the suspended load control apparatus to provide the control input to the suspended load control apparatus.

Example 53. The apparatus according to Example 51, further comprising means to maintain a priority order among the first remote pendant and the second remote pendant, wherein means to maintain the priority order among the first remote pendant and the second remote pendant comprises means to maintain a list of remote pendants which have authenticated with the multi-pendent management module.

Example 54. The apparatus according to Example 53, further comprising means to order the list of remote pendants which have authenticated with the multi-pendent management module based on at least one of an authentication order among the remote pendants which have authenticated with the multi-pendent management module and a user input regarding priority order.

Example 55. The apparatus according to Example 53, further comprising means to remove a remote pendant from the list of remote pendants which have authenticated with the multi-pendent management module based on a timeout interval.

Example 56. The apparatus according to Example 45, wherein means to determine which of the first remote pendant and the second remote pendant is to provide the control input to the suspended load control apparatus comprises means to determine that one of the first remote pendant and the second remote pendant is a master remote pendant and provide the control input from the master remote pendant to the suspended load control apparatus.

Example 57. The apparatus according to Example 45, further comprising means to determine that an authenticated session with a remote pendant which has not timed out and means to determine which of the first remote pendant and the second remote pendant are to provide the control input to the suspended load control apparatus based at least in part on the authenticated session with the remote pendant which has not timed out.

Example 58. The apparatus according to Example 45, further comprising means to transmit an identity of a controlling remote pendant, wherein the controlling remote pendant is one of the first remote pendant or the second remote pendant determined to provide the control input to the suspended load control module.

Example 59. The apparatus according to Example 58, wherein the identity of the controlling remote pendant is associated with the first remote pendant and further comprising means to determine that the first remote pendant has released a right to be the controlling remote pendant.

Example 60. The apparatus according to Example 59, further comprising means to determine that the second remote pendant is authenticated with respect to the load control apparatus and means to provide the control input from the second remote pendant to the suspended load control apparatus.

Example 61. The apparatus according to Example 45, further comprising means to determine that an error has occurred and requesting at least one of the first remote pendant and the second remote pendant to provide an error response.

Example 62. The apparatus according to Example 61, wherein the error comprises one of a wireless communication loss, a wireless communication module error, an out-of-bounds control input instruction, or a power supply error and wherein the error response comprises an error data from a subsystem or system of at least one of the first remote pendant and the second remote pendant.

Example 63. The apparatus according to Example 45, wherein the control input comprises at least one of a remote pendant status and a remote pendant event.

Example 64. The apparatus according to Example 63, wherein the remote pendant event comprises at least one of a user selection of a user mode or command state of the load control system and an indication of a thrust vector to be output by the load control system.

Example 65. The apparatus according to Example 63, wherein the remote pendant status comprises at least one of a power supply status and a remote pendant error.

Example 66. The apparatus according to Example 45, wherein means to determine the position, orientation, or motion of the load based on the sensor data from the sensor suite comprises means to combine the sensor data from the sensor suite through a non-linear filter to determine a current state and wherein means to produce the thruster vector to influence at least one of the position, orientation, or motion of the load comprises means to project near-term future motion based on the current state with feedback from at least one of a functional mode or command state of an operational module, a thrust and orientation mapping, or a fan mapping.

Example 67. One or more computer-readable media comprising instructions that cause a computer device, in response to execution of the instructions by a processor of the computer device, to: determine which of a first remote pendant and a second remote pendant is to provide a control input to a load control apparatus, wherein the control input is to control a thrust vector produced by an at least one thruster of the load control apparatus; receive the control input; determine a position, orientation, or motion of the load based on a sensor data from the sensor suite, and, in response to the control input, produce the thruster vector to influence at least one of the position, orientation, or motion of the load.

Example 68. The computer-readable media according to Example 67, wherein to determine which of the first remote pendant and the second remote pendant is to provide the control input comprises to determine that at least one of the first remote pendant and the second remote pendant is authenticated.

Example 69. The computer-readable media according to Example 68, wherein, when executed by the processor of the computer device, the instructions further cause the computer device to receive with a wireless communication system at least one of a first message from the first remote pendant and a second message from the second remote pendant; and wherein to determine that at least one of the first remote pendant and the second remote pendant is authenticated comprises to determine that at least one of the first message and the second message comprises an authentication credential.

Example 70. The computer-readable media according to Example 69, wherein the authentication credential comprises at least one of an identifier of the load control apparatus and an identifier of an authenticated remote pendant.

Example 71. The computer-readable media according to Example 70, wherein, when executed by the processor of the computer device, the instructions further cause the computer device to obtain at least one of the identifier of the load control apparatus or the identifier of the authenticated remote pendant from a non-volatile memory of at least one of the load control apparatus, a non-volatile memory of the first remote pendant, or a non-volatile memory of the second pendant.

Example 72. The computer-readable media according to Example 67, wherein, when executed by the processor of the computer device, the instructions further cause the computer device to determine that at least one of the first remote pendant and the second remote pendant is authenticated with respect to the load control apparatus according to non-transient secure identifier of an authenticated remote pendant and to assign a transient identifier of an authenticated remote pendant to at least one of the first remote pendant and the second remote pendant.

Example 73. The computer-readable media according to Example 72, wherein the transient identifier of the authenticated remote pendant comprises fewer data bits than the non-transient secure identifier of the authenticated remote pendant.

Example 74. The computer-readable media according to Example 67, wherein to determine which of the first remote pendant and the second remote pendant is to provide the control input to the suspended load control apparatus comprises to allow a first remote pendant to authenticate with the computer device to provide the control input to the suspended load control apparatus.

Example 75. The computer-readable media according to Example 67, wherein, when executed by the processor of the computer device, the instructions further cause the computer device to maintain a priority order among the first remote pendant and the second remote pendant, wherein to maintain the priority order among the first remote pendant and the second remote pendant comprises to maintain a list of remote pendants which have authenticated with the multi-pendent management module.

Example 76. The computer-readable media according to Example 75, wherein, when executed by the processor of the computer device, the instructions further cause the computer device to order the list of remote pendants which have authenticated with the computer device based on at least one of an authentication order among the remote pendants which have authenticated with the computer device and a user input regarding priority order.

Example 77. The computer-readable media according to Example 75, wherein, when executed by the processor of the computer device, the instructions further cause the computer device to remove a remote pendant from the list of remote pendants which have authenticated with the multi-pendent management module based on a timeout interval.

Example 78. The computer-readable media according to Example 67, wherein to determine which of the first remote pendant and the second remote pendant is to provide the control input to the suspended load control apparatus comprises to determine that one of the first remote pendant and the second remote pendant is a master remote pendant and to provide the control input from the master remote pendant to the suspended load control apparatus.

Example 79. The computer-readable media according to Example 67, wherein, when executed by the processor of the computer device, the instructions further cause the computer device to determine that an authenticated session with a remote pendant which has not timed out and to determine which of the first remote pendant and the second remote pendant are to provide the control input to the suspended load control apparatus based at least in part on the authenticated session with the remote pendant which has not timed out.

Example 80. The computer-readable media according to Example 67, wherein, when executed by the processor of the computer device, the instructions further cause the computer device to transmit an identity of a controlling remote pendant, wherein the controlling remote pendant is one of the first remote pendant or the second remote pendant determined to provide the control input to the suspended load control module.

Example 81. The computer-readable media according to Example 80, wherein the identity of the controlling remote pendant is associated with the first remote pendant and wherein, when executed by the processor of the computer device, the instructions further cause the computer device to determine that the first remote pendant has released a right to be the controlling remote pendant.

Example 82. The computer-readable media according to Example 81, wherein, when executed by the processor of the computer device, the instructions further cause the computer device to determine that the second remote pendant is authenticated with respect to the load control apparatus and cause the computer device to provide the control input from the second remote pendant to the suspended load control apparatus.

Example 83. The computer-readable media according to Example 67, wherein, when executed by the processor of the computer device, the instructions further cause the computer device to determine that an error has occurred and requesting at least one of the first remote pendant and the second remote pendant to provide an error response.

Example 84. The computer-readable media according to Example 83, wherein the error comprises one of a wireless communication loss, a wireless communication module error, an out-of-bounds control input instruction, or a power supply error and wherein the error response comprises an error data from a subsystem or system of at least one of the first remote pendant and the second remote pendant.

Example 85. The computer-readable media according to Example 67, wherein the control input comprises at least one of a remote pendant status and a remote pendant event.

Example 86. The computer-readable media according to Example 85, wherein the remote pendant event comprises at least one of a user selection of a user mode or command state of the load control system and an indication of a thrust vector to be output by the load control system.

Example 87. The computer-readable media according to Example 85, wherein the remote pendant status comprises at least one of a power supply status and a remote pendant error.

Example 88. The computer-readable media according to Example 67, wherein to determine the position, orientation, or motion of the load based on the sensor data from the sensor suite comprises to combine the sensor data from the sensor suite through a non-linear filter to determine a current state and wherein to produce the thruster vector to influence at least one of the position, orientation, or motion of the load comprises to project near-term future motion based on the current state with feedback from at least one of a functional mode or command state of an operational module, a thrust and orientation mapping, or a fan mapping.

What is claimed is:

1. A load control system to influence at least one of a position, orientation, or motion of a load suspended by a cable from a carrier, comprising:

at least one thruster, a sensor suite, a computer processor, and a computer memory, wherein the computer memory comprises a suspended load control module and a multi-pendant management module;

wherein, when executed by the computer processor, the multi-pendant management module determines which of a first remote pendant and a second remote pendant is to provide a control input to the suspended load control module; and wherein, when executed by the computer processor, the suspended load control module receives the control input, determine a position, orientation, or motion of the load based on a sensor data from the sensor suite, and, in response to the control input, causes the at least one thruster to influence at least one of the position, orientation, or motion of the load.

2. The load control system according to claim 1, wherein to determine which of the first remote pendant and the second remote pendant is to provide the control input to the suspended load control module, the multi-pendant management module determines that at least one of the first remote pendant and the second remote pendant is authenticated with respect to the load control system.

3. The load control system according to claim 2, wherein the multi-pendant management module further determines that at least one of the first remote pendant and the second remote pendant is authenticated with respect to the load control system according to a non-transient secure identifier of an authenticated remote pendant and assign a transient identifier of an authenticated remote pendant to at least one of the first remote pendant and the second remote pendant, wherein the transient identifier of the authenticated remote pendant comprises fewer data bits than the non-transient secure identifier of the authenticated remote pendant.

4. The load control system according to claim 1, wherein the multi-pendant management module further maintains a priority order among the first remote pendant and the second remote pendant, and wherein the multi-pendant management module further determines which of the first remote pendant and the second remote pendant is to provide the control input to the suspended load control module based at least in part on the priority order, and wherein to maintain the priority order among the first remote pendant and the second remote pendant, the multi-pendant management module maintains a list of remote pendants which have authenticated with the multi-pendent management module.

5. The load control system according to claim 4, wherein the multi-pendent management module further orders the list of remote pendants which have authenticated with the multi-pendent management module based on at least one of an authentication order among the remote pendants which have authenticated with the multi-pendent management module and a user input regarding priority order.

6. The load control system according to claim 4, wherein the multi-pendent management module further removes a remote pendant from the list of remote pendants which have authenticated with the multi-pendent management module based on a timeout interval.

7. The load control system according to claim 1, wherein to determine which of the first remote pendant and the second remote pendant is to provide the control input to the suspended load control module, the multi-pendant management module determines that one of the first remote pendant and the second remote pendant is a master remote pendant and wherein the multi-pendant management module provides the control input from the master remote pendant to the suspended load control module.

8. The load control system according to claim 1, wherein the multi-pendant management module further transmits an identity of a controlling remote pendant, wherein the controlling remote pendant is one of the first remote pendant or the second remote pendant determined to provide the control input to the suspended load control module, wherein the identity of the controlling remote pendant is the first remote pendant and wherein the multi-pendant management module further determines that the first remote pendant has released a right to be the controlling remote pendant.

9. The load control system according to claim 8, wherein the multi-pendant management module further determines that the second remote pendant is authenticated with respect to the load control system and provides the control input from the second remote pendant to the suspended load control module.

10. The load control system according to claim 1, wherein the suspended load control module determines the position, orientation, or motion by combining the sensor data from the sensor suite through a non-linear filter to determine a current state, wherein the suspended load control module further projects near-term future motion based on the current state with feedback from at least one of a functional mode or command state of an operational module, a thrust and orientation mapping, or a fan mapping.

11. A method to influence at least one of a position, orientation, or motion of a load suspended by a cable from a carrier with a load control apparatus, the load control apparatus comprising least one thruster, a sensor suite, a computer processor, and a computer memory, the method comprising:

determining which of a first remote pendant and a second remote pendant is to provide a control input to the load control apparatus, wherein the control input is to control a thrust vector produced by the at least one thruster;

receiving the control input;

determining a position, orientation, or motion of the load based on a sensor data from the sensor suite, and, in response to the control input, producing the thruster vector to influence at least one of the position, orientation, or motion of the load.

12. The method according to claim 11, wherein determining which of the first remote pendant and the second remote pendant is to provide the control input comprises determining that at least one of the first remote pendant and the second remote pendant is authenticated.

13. The method according to claim 11, further comprising determining that at least one of the first remote pendant and the second remote pendant is authenticated with respect to the load control apparatus according to non-transient secure identifier of an authenticated remote pendant and assigning a transient identifier of an authenticated remote pendant to at least one of the first remote pendant and the second remote pendant, wherein the transient identifier of the authenticated remote pendant comprises fewer data bits than the non-transient secure identifier of the authenticated remote pendant.

14. The method according to claim 11, wherein determining which of the first remote pendant and the second remote pendant is to provide the control input to the suspended load control apparatus comprises determining that one of the first remote pendant and the second remote pendant is a master remote pendant and providing the control input from the master remote pendant to the suspended load control apparatus.

15. The method according to claim 11, wherein determining the position, orientation, or motion of the load based on the sensor data from the sensor suite comprises combining the sensor data from the sensor suite through a non-linear filter to determine a current state and wherein producing the thruster vector to influence at least one of the position, orientation, or motion of the load comprises projecting near-term future motion based on the current state with feedback from at least one of a functional mode or command state of an operational module, a thrust and orientation mapping, or a fan mapping.

16. An apparatus to influence at least one of a position, orientation, or motion of a load suspended by a cable from a carrier, comprising:

means comprising a computer processor and computer memory for determining which of a first remote pendant and a second remote pendant is to provide a control input to the load control apparatus, wherein the control input is to control a thrust vector produced by the at least one thruster;

means to receive the control input;

means to determine a position, orientation, or motion of the load based on a sensor data from the sensor suite and, in response to the control input, means to produce the thruster vector to influence at least one of the position, orientation, or motion of the load.

17. The apparatus according to claim 16, wherein means for determining which of the first remote pendant and the second remote pendant is to provide the control input comprises means for determining that at least one of the first remote pendant and the second remote pendant is authenticated.

18. The apparatus according to claim 16, further comprising means for determining that at least one of the first remote pendant and the second remote pendant is authenticated with respect to the load control apparatus according to non-transient secure identifier of an authenticated remote pendant and means to assign a transient identifier of an authenticated remote pendant to at least one of the first remote pendant and the second remote pendant, wherein the transient identifier of the authenticated remote pendant comprises fewer data bits than the non-transient secure identifier of the authenticated remote pendant.

19. The apparatus according to claim 18, further comprising means to maintain a priority order among the first remote pendant and the second remote pendant, wherein means to maintain the priority order among the first remote pendant and the second remote pendant comprises means to maintain a list of remote pendants which have authenticated with the multi-pendent management module, further comprising means to order the list of remote pendants which have authenticated with the multi-pendent management module based on at least one of an authentication order among the remote pendants which have authenticated with the multi-pendent management module and a user input regarding priority order.

20. The apparatus according to claim 16, wherein means for determining the position, orientation, or motion of the load based on the sensor data from the sensor suite comprises means to combine the sensor data from the sensor suite through a non-linear filter to determine a current state and wherein means to produce the thruster vector to influence at least one of the position, orientation, or motion of the load comprises means to project near-term future motion based on the current state with feedback from at least one of a functional mode or command state of an operational module, a thrust and orientation mapping, or a fan mapping.

* * * * *